US011885900B2

(12) United States Patent
Pipelidis et al.

(10) Patent No.: US 11,885,900 B2
(45) Date of Patent: Jan. 30, 2024

(54) METHOD AND SYSTEM FOR TRACKING A MOBILE DEVICE

(71) Applicant: Technische Universität München, Munich (DE)

(72) Inventors: Georgios Pipelidis, Munich (DE); Nikolaos Tsiamitros, Munich (DE); Christian Prehofer, Starnberg (DE)

(73) Assignee: Technische Universität München, Munich (DE)

( * ) Notice: Subject to any disclaimer, the term of this patent is extended or adjusted under 35 U.S.C. 154(b) by 386 days.

(21) Appl. No.: 17/420,568

(22) PCT Filed: Jan. 10, 2020

(86) PCT No.: PCT/EP2020/050584
§ 371 (c)(1),
(2) Date: Jul. 2, 2021

(87) PCT Pub. No.: WO2020/144353
PCT Pub. Date: Jul. 16, 2020

(65) Prior Publication Data
US 2022/0113366 A1 Apr. 14, 2022

(30) Foreign Application Priority Data

Jan. 10, 2019 (EP) .................................... 19151114

(51) Int. Cl.
*H04W 4/02* (2018.01)
*G01S 5/02* (2010.01)
*G01C 21/20* (2006.01)
(52) U.S. Cl.
CPC .......... *G01S 5/0278* (2013.01); *G01C 21/206* (2013.01); *H04W 4/027* (2013.01)
(58) Field of Classification Search
CPC ..... G01S 5/0278; G01C 21/206; H04W 4/027
(Continued)

(56) References Cited

U.S. PATENT DOCUMENTS

2012/0007779 A1   1/2012   Klepal et al.
2012/0086606 A1   4/2012   Mathews et al.
(Continued)

FOREIGN PATENT DOCUMENTS

CA     2 894 863 A1    12/2016
CN     104215238 A     12/2014
(Continued)

OTHER PUBLICATIONS

Extended European Search Report, dated Jul. 25, 2019, for European Application No. 19151114.6-003, 9 pages.
(Continued)

*Primary Examiner* — Ted M Wang
(74) *Attorney, Agent, or Firm* — Seed IP Law Group LLP

(57) ABSTRACT

A computer-implemented method for tracking a mobile device based on a series of motion measurements of said device comprises retrieving a topological map providing a graph of topological paths, wherein each topological path is associated with a corresponding path direction; statistically generating, on a virtual map, a plurality of particles around an estimated initial position of the mobile device, representing an initial uncertainty of said estimated initial position of the mobile device; determining, from said series of motion measurements, a measured displacement vector of the mobile device representing an estimated displacement direction and an estimated displacement distance of the mobile device; displacing each of said particles on the virtual map according to a randomized particle displacement vector which is derived from said measured displacement vector based on an uncertainty of the measured displacement vector and recording said particle displacement vector for each displaced particle; determining a weight of each particle based on a comparison of the respective particle displacement vector with the path direction of an adjacent topologi-
(Continued)

cal path and/or based on a distance of the particle to the adjacent topological path; selecting a subset of said displaced particles for resampling based on a particle-weight dependent selection criterion; and regenerating said selected subset of displaced particles within a particle regeneration area around a current mean location of the plurality of particles according to a probability distribution.

20 Claims, 8 Drawing Sheets

(58) Field of Classification Search
USPC ....................................................... 455/456.1
See application file for complete search history.

(56) References Cited

U.S. PATENT DOCUMENTS

| | | | |
|---|---|---|---|
| 2012/0143495 | A1 | 6/2012 | Dantu |
| 2015/0282111 | A1 | 10/2015 | Yang et al. |
| 2016/0371394 | A1 | 12/2016 | Shahidi et al. |
| 2017/0312614 | A1* | 11/2017 | Tran .......................... G06F 3/00 |

FOREIGN PATENT DOCUMENTS

| | | |
|---|---|---|
| CN | 104426057 A | 3/2015 |
| CN | 104482933 A | 4/2015 |
| CN | 106441302 A | 2/2017 |
| CN | 106767828 A | 5/2017 |
| CN | 103925923 B | 6/2017 |
| CN | 107504971 A | 12/2017 |
| EP | 2 570 772 A1 | 3/2013 |
| EP | 2 711 670 A1 | 3/2014 |
| GB | 2520751 A | 6/2015 |
| WO | 2012/019794 A1 | 2/2012 |
| WO | 2014/066024 A1 | 5/2014 |
| WO | 2015/024516 A1 | 2/2015 |

OTHER PUBLICATIONS

International Search Report and Written Opinion, dated Apr. 21, 2020, for International Application No. PCT/EP2020/050584, 14 pages.

Dellaert et al., "Monte Carlo Localization for Mobile Robots," in *Proceedings 1999 IEEE International Conference on Robotics and Automation (Cat. No. 99CH36288C)*, Institute of Electrical and Electronics Engineers, Detroit, USA, May 10-15, 1999, vol. 2, pp. 1322-1328.

Hu et al., "A Visible Light-based Positioning System," arXiv: 1505.05977v3 [cs.NI], Jun. 2, 2015, 16 pages.

Jiménez et al., "A Comparison of Pedestrian Dead-Reckoning Algorithms using a Low-Cost MEMS IMU," *2009 IEEE International Symposium on Intelligent Signal Processing*, Institute of Electrical and Electronics Engineers, Budapest, Hungary, Aug. 26-28, 2009, pp. 37-42.

Liu et al., "Mobile Robots Global Localization Using Adaptive Dynamic Clustered Particle Filters," in *Proceedings of the 2007 IEEE/RSJ International Conference on Intelligent Robots and Systems*, Institute of Electrical and Electronics Engineers/Robotics Society of Japan, San Diego, USA, Oct. 29-Nov. 2, 2007, pp. 1059-1064.

\* cited by examiner

METHOD AND SYSTEM FOR TRACKING A MOBILE DEVICE

BACKGROUND

Technical Field

The present invention is in the field of location tracking. More precisely, the present invention relates to the tracking of portable mobile devices based on motion measurements.

Description of the Related Art

Localization services are widely used today in autonomous vehicles, robotics, augmented reality, location based services and mobile ad-hoc networks. Precise localization implies the awareness of the location of a human or an object even when other localization techniques, such as GPS, are not available. In theory, precise localization can be achieved in off-the-shelf devices, such as modern smartphones, since they are equipped with all the required sensors, such as accelerometer, gyroscope, compass, barometer, magnetometer and other sensors. However, such sensors are typically of limited quality, which usually results in a high localization uncertainty. Hence, this uncertainty has to be taken into consideration when performing localization.

A common solution for considering this uncertainty is the use of a particle filter based dead reckoning approach, wherein the estimated position emerges from a statistical weighting of discrete virtual position candidates which are individually displaced through a virtual map of a location based on sensor measurements of the mobile device. These successively displaced particles may then form an expanding particle cloud on the map. To reduce this accumulating uncertainty-induced spreading, the probability of the historic routes of each particle can be calculated based on a comparison of the particle locations with the geometry of the geographic area to determine the most probable path taken by the tracked device.

For example, GB 2 520 751 A discloses a particle filtering method for dead reckoning wherein a particle set is generated to represent a probability distribution for the current position of a tracked portable device. The measurements of inertial sensors of the portable device are used to infer displacement vectors and Bayesian statistical data fusion techniques are used to improve the motion classification and associated movements to derive a most probable displacement of the device. Particles from the particle set are statistically selected and displaced according to the determined most probable displacement, taking into account a particle specific deviation from the most probable displacement which is statistically generated when a particle is resampled. Particles crossing or going close to a wall according to a geometric map of a location are reweighted and are more probable particle resampling candidates. By recursively correcting systematic errors in the heading or step length determination of a human operator, a past history of the portable device can be corrected and the current most probable location of the portable device can be inferred.

EP 2 909 582 A1 discloses a map assisted sensor based positioning of mobile devices, wherein a step history is recorded by the device and then matched to the geometry of a floor plan through a recursive correction of systematic errors in the heading or step length of the user. To that end, a cost function of the route history is calculated for different heading or step length assumptions to correct for systematic errors in the initial values, which may then be used in a dead reckoning navigation method with improved underlying assumptions to provide further localization. When available, the route history may also be recursively matched to a waypoint sequence.

BRIEF SUMMARY

The known methods and corresponding devices however require a large and increasing virtual particle number to represent the statistical motion measurement errors of the mobile device leading to increased computational load on the mobile device. Even though the particle filter is a robust solution to the problem of tracking a device based on a series of inaccurate measurements, it adds computational overhead which grows exponentially in time and can usually not be addressed through a smartphone's microprocessor. Today, this problem is typically addressed by executing the particle filtering on a cloud based processing system at a distant location from the tracked device. Unfortunately, an internet connection for real time transmission of motion measurements is not always available, and overall such an approach does not solve the problem of efficient tracking but instead relocates it.

In view of this state-of-the-art, the object of the invention is to provide a tracking strategy for a mobile device based on motion measurements of the device which can allow reducing a computational effort required to track the mobile device.

This object is solved by a method, a system and a computer program for tracking a mobile device according to the independent claims. The dependent claims relate to preferred embodiments.

According to a first aspect, the invention relates to a computer-implemented method for tracking a mobile device in a geographic area based on a series of motion measurements of said device. Said method comprises the steps of:
  a) retrieving a topological map for said geographic area, said topological map providing a graph of topological paths through said geographic area, wherein each topological path is associated with a corresponding path direction;
  b) statistically generating, on a virtual map of said geographic area, a plurality of particles around an estimated initial position of the mobile device, a spatial dispersion of said particles within said uncertainty radius representing an initial uncertainty of said estimated initial position of the mobile device;
  c) determining, from said series of motion measurements, a measured displacement vector of the mobile device, the measured displacement vector representing an estimated displacement direction and an estimated displacement distance of the mobile device;
  d) displacing each of said particles on the virtual map according to a randomized particle displacement vector which is derived from said measured displacement vector based on an uncertainty of the measured displacement vector and recording said particle displacement vector for each displaced particle;
  e) determining a weight of each particle based on a comparison of the respective particle displacement vector with the path direction of an adjacent topological path and/or based on a distance of the particle to the adjacent topological path;
  f) resampling the plurality of particles, said resampling comprising selecting a subset of said displaced particles based on a particle-weight dependent selection criterion, wherein said selection criterion is such that particles with lower weight are more likely to be resampled than particles with higher weight; and g) wherein the resampling further comprises regenerating said selected subset of displaced particles within a particle regeneration area around a current mean location of the plurality of particles according to a probability distribution.

Thus, according to the method, an estimated position of the mobile device may be tracked according to a current mean location of the plurality of particles which can be displaced on the virtual map. Said virtual map can be a coordinate representation of the geographic area for describing the position of the plurality of particles in said geographic area, and may thus associate coordinates of the particles with a real space location in the geographic area. The virtual map may optionally contain mapped objects, such as walls, tables, doors, escalators, stairs, windows, or the like, and which may be described by a characteristic coordinate set for and/or a characteristic outline of said mapped object on the virtual map. The map may have several layers corresponding to different floors of a geographic area and may generally be three-dimensional, even though the following discussion will focus mostly on two-dimensional maps for the sake of brevity.

The plurality of particles are virtual particles representing a discretized probability distribution for the most probable current position of the mobile device, wherein each of said plurality of particles can be a position candidate for the mobile device and wherein a (weighted) mean location of said plurality of particles can represent a current most likely position for said mobile device.

The method also foresees providing a graph of topological paths through said geographic area. The graph of topological paths may be a mathematical graph comprising edges and vertices, wherein the topological paths may be edges of said graph, and wherein said edges can be directional or non-directional or any combination thereof. However, the skilled person will appreciate that said graph may also be an aggregation of path vectors representing said topological paths through said geographic area and vertices may be end points or crossing points of said topological paths. Thus, a topological path can be considered as a connection line between endpoints of straight path segments or a corresponding vector. Arbitrary topological path shapes, such as curves or intersections, may be represented by corresponding mathematical constructs, but may also be assembled from a plurality of straight path segments.

The topological paths should represent route candidates in the geographical area which a mobile device is likely to follow and are preferably associated with both a respective path direction and a respective path width. For example, a topological path may be provided in the center of a corridor, wherein a width associated with said topological path in said corridor may be the width of the corridor. The topological path may be directional, such as to indicate a preferred displacement direction along said topological path. For example, an escalator may provide only a single direction of displacement within an associated geographic area. Similarly, a cultural imprint may give preference to paths running on the left or right side of a corridor, and the graph of topological paths may represent said cultural imprint by providing spatially separated directional topological paths on either side of a centerline through a corridor. The graph of topological paths used herein may be generated as a grammar of a topological map, such as an open street map, wherein the initial topological map can be processed to determine appropriate path widths, which may be determined from country specific minimum or conventional corridor widths, e.g., derived from a building regulation regarding accessibility or building safety, or derived from a layout of the geographic area.

The method can then track a particle by providing an optimized update and particle weighting scheme and can reduce the required number of concurrently tracked particles by giving preference to semantically or empirically identified movement patterns for the mobile device. In particular, a combination of weighting of the particles based on the properties of the adjacent topological path and the subsequent regeneration around the current mean location according to said probability distribution leads to an increased error tolerance of the navigation system, thereby allowing a navigation system to be implemented locally on the device and/or with lower particle numbers.

The particle tracking is initiated with the generation of the plurality of particles according to an initial location uncertainty around an estimated initial position of the mobile device on the virtual map of the geographic area, such as within a determined or pre-configured uncertainty radius. The estimated initial position of the mobile device may be derived from a location signal, such as a Wi-Fi signal, RF signal, GPS signal, barometric signal, characteristic motion model derived signal, luminosity signal, or similar signal, or a loss or reduction of such a signal. For example, the method for tracking a mobile device may be initiated by the mobile device entering a building and said entering of a building may be detected by the mobile device based on a reduction of a measured luminosity and/or GPS-signal strength and/or a detection of a reference location, such as a signal of a Wi-Fi router located close to an entrance of the building. Based on the origin of the estimated initial position, an uncertainty radius for the mobile device pertaining to a valuation of the location uncertainty may be initialized to a given value and the plurality of particles may be generated within said uncertainty radius around the estimated initial position. The statistical generation of the plurality of particles may also take into account a probability distribution of said particles around said initial position, such as a normal distribution around said estimated initial position, wherein a variance of the normal distribution may be based on or derived from the uncertainty radius. In addition, the initialized particles may be associated with a corresponding weight according to a probability distribution around the initial estimated position. If no reliable initial position of the mobile device is available, the plurality of particles may also be initially spread over the virtual map or may be distributed among probable initial candidate locations, e.g., building entrances of a building map.

The method then proceeds with tracking the mobile device in the geographic area based on a series of motion measurements of the device from which a displacement vector for the device can be determined. The motion measurements may be performed by the device by a displacement sensor or an inertial sensor integrated in the mobile device, such as one or more of a gyroscope, a compass, an accelerometer, a pedometer, a barometer, a light sensor, an RF (radio frequency) transmitter, a magnetometer, and a wheel counter for a robot integrated with the mobile device. For example, the RF transmitter, such as a WiFi or Bluetooth transmitter, may be used to obtain (WiFi-) location fingerprints, to perform a series of triangulations or to estimate a Doppler effect with respect to a known location of a RF emitter in the geographic area, and the mobile device may therefrom determine a displacement vector for said device. Preferably, motion measurements are at least partially provided by one or more of a gyroscope, compass and inertial sensor of said mobile device, such as the sensors commonly integrated with smartphones, and may be consolidated by a pedometer to infer the occurrence of a step, as well as an associated direction or step length. However, any motion measurements known in the art, such as a displacement estimation based on a sequence of determined positions for the mobile device may equally be used, such as a series of location measurements. Additionally, measurements of external motion sensors coupled to the mobile device can be used to determine and/or influence the measured displacement vector. For example, a spatial motion and/or orientation of a wearable device, such as a smartwatch, can be detected based on measured data from accelerometer sensors and/or gyroscope sensors of the wearable device.

In some embodiments, external devices coupled via a communication path to the mobile device may provide measured data or motion measurements based on a probe signal wirelessly emitted by the mobile device. For example, one or more external devices may be arranged within the geographical area and may be configured to detect the probe signal emitted by the mobile device. The one or more external devices may include a base station which may receive a WiFi- or a mobile communication signal (e.g., 3G, 4G, 5G) emitted by the mobile device, such as network packets which are broadcasted periodically in order to detect nearby Access Points (AP), wherein the network packets may be emitted even when the mobile device is not in active use, e.g., in the form of WiFi Probe requests. Based on the detected signals by the one or more external devices, measured data indicating the direction and/or velocity of the mobile device may be obtained, e.g., by capturing consecutive packets emitted wirelessly by the mobile device.

For example, localization for RF signals can be achieved based on proximity sensing or trilateration, where trilateration can be achieved based on Time of Arrival (ToA), Time Difference of Arrival (TDoA), using propagation-loss, Angle of Arrival (AoA), wave propagation estimation based on Friis formula or via pattern recognition and fingerprinting methods of the probe signal.

Based on the localization result, a movement direction or a location measurement may be obtained which may be used to determine a displacement vector for the mobile device or the displacement vector may be determined based on the localization result in the mobile terminal. The mobile device can be associated with the probe signal based on a unique identifier emitted with the probe signal or by a functional property of the mobile device affecting the probe signal, such as by the properties of its antenna. The external device may be using multiple antennas that enable it to listen to signals emitted by devices in an area, or it may hop in different channels and frequencies (e.g., channels 1 to 11 from 2.4 GHz or channels 36 to 165 for 5 GHz). As an example, the external device may include an ISMI sniffing tool to monitor the presence of different mobile communication enabled devices in its vicinity.

Hence, in some embodiments, the mobile device is configured to receive measured data and/or motion measurements from one or more external devices, wherein the measured data and/or motion measurements are based on properties of a probe signal emitted wirelessly by the mobile device and received by the one or more external devices.

The measured data may comprise a localization component associated with the mobile device, such as a proximity measurement, a trilateration component, or a trilateration result from one or more external devices, and the mobile device may be configured to determine the motion measurement based on the received localization component.

In some embodiments, the external devices may communicate measured data based on the probe signal to a server which consolidates and/or processes the measured data and communicates a motion measurement or one or more localization components to the mobile device associated with the probe signal.

Based on the motion measurements, a measured displacement vector is determined representing both a displacement direction and a displacement distance for the mobile device.

Even though the method according to the first aspect and its embodiments can be used with an arbitrary type of device, a particularly relevant mobile device is a mobile device carried by a human operator or attached to an animal to track movements of humans or animals in indoor areas, where common locating strategies based on signals from mobile communication base stations or GPS signals are less effective and where the relative orientation of the mobile device with respect to the human operator and/or animal may be nondeterministic and/or varying in time. Thus, the following description of the method will, without intending any loss of generality, focus on a mobile terminal, such as a smartphone or smartwatch, carried by human operator to better illustrate the effect of the features of the tracking method in view of common measurement errors and irregularities in the motion of human operators, even though the skilled person will appreciate that the method can be also advantageously applied to other mobile devices, such as portable locating modules in robots.

Human-portable mobile devices are usually integrated with a combination of inertial sensors, such as MEMS-based accelerometers and/or a gyroscopes, and magnetometers (e.g., compasses) to determine the orientation of the mobile device with respect to a gravitational force and relative accelerations of the mobile device. However, the speed and/or the effective displacement direction may only be accessible after integration or identification of movement patterns related to characteristic movements of a human operator or animal, such as periodic oscillations determined from the acceleration measurements along a given direction in space conforming to leg movement. In addition, the motion measurements may be more suitable to measure direction changes than direction. In some embodiments, the method therefore comprises initializing a displacement vector according to an outline in a geographic area, such as the edge direction of a building or associated corridor direction, and/or a path direction of a topological path close to the estimated initial position. The method may then determine the displacement vector based on the series of motion measurements and on a previously determined displacement vector, or in other words, a previously determined displacement vector may be modified based on the series of motion measurements as part of determining the measured displacement vector. In some examples, the method comprises calculating an estimated displacement vector based on a mean (weighted) particle displacement vector and determining the measured displacement vector comprises modifying the estimated displacement vector based on the series of motion measurements. Determining the initial displacement vector may comprise fitting the displacement direction to at least one topological path within the initial uncertainty radius around the estimated initial location.

In preferred embodiments, the method further comprises determining, based on said series of motion measurements, the uncertainty of the measured displacement vector of the mobile device.

Thus, the mobile device may also determine an uncertainty associated with the displacement vector based on the series of motion measurements. For example, a noise or variance in a sensor signal may be determined and may be used to estimate an uncertainty of the associated motion measurement for the mobile device. However, said uncertainty may also be predetermined or derived from a calculated likelihood of the current position estimate.

The measured displacement vector can then be used to displace each of said particles. To take into account an uncertainty of the measured displacement vector, a randomized displacement vector can be generated for each particle wherein the degree of randomization can depend on the uncertainty of the measured displacement vector.

In preferred embodiments, the uncertainty of the measured displacement vector comprises an uncertainty of the estimated displacement direction, and displacing each of said particles comprises statistically generating a displacement direction for each of said particles according to a probability distribution based on said uncertainty of the estimated displacement direction.

For example, a heading error of the displacement direction of the mobile device may be associated with an estimated uncertainty, such as 20°, and a randomized particle displacement vector may be statistically generated based on a probability (e.g., normal) distribution having a variance based on said estimated uncertainty.

In some embodiments, the uncertainty of the measured displacement vector further comprises an uncertainty of the estimated displacement distance, and a displacement distance of the randomized particle displacement vector is at least partially randomized according to a normal distribution with a variance given by said uncertainty of the estimated displacement distance.

However, the particles may also be displaced according to the measured displacement vector and a randomized particle position may be obtained for each individual particle by randomly displacing said particle from its new particle position based on to the estimated uncertainty, e.g., by picking a partially randomized particle position according to a probability (e.g., normal) distribution around the new particle position. The randomized particle displacement vector may then be a connection between the previous particle position and the partially randomized particle position.

The method then determines a weight of each particle based on a comparison of the respective particle displacement vector with the path direction of an adjacent topological path and/or based on a distance of the particle to the adjacent topological path. Thus, particles following the adjacent topological paths will be attributed a higher weight than particles deviating in heading and/or distance from said adjacent topological path. Said comparison may be implemented according to any arbitrary weighting rule, such as a scalar product of the normalized direction of the particle displacement vector with the path direction, a function using said scalar product or any comparable weighting scheme attributing lower weight to relative perpendicular orientations and higher weight to relative parallel orientations. Similarly, the particle weight determined based on a distance of the particle to the adjacent topological path may be performed according to any weighting function (e.g., a probability distribution around said topological path). For example, the particle weight may be reweighted according to a normal distribution around the topological path, wherein a variance of said normal distribution can depend on a path width associated with the topological path. The width of a topological path may be stored with the topological paths as a grammar of the map and can in principle depend on a position along said path and/or may differ between different topological paths to take into account different shapes and/or different geometric widths of a "walkable area," e.g., different corridors, in the geometric area. It is noted that the weight may be determined based on a previous weight of the particle, such as based on the last determined weight for said particle, to allow for a gradual change of the weight during a series of steps, but may also be re-initialized to a common initial value (e.g., 1) after resampling to attribute equal weight to all remaining particles after resampling.

The particle weight used and defined herein provides a high value for a particle having a high likelihood to correspond with the true location of the mobile device and a low weight for a particle having a low likelihood, wherein lower-weight particles are more likely candidates for resampling. The skilled person will appreciate that an inverse definition is equally possible, e.g., a high value of the weight leads to an increased likelihood for resampling of the particle, and merely constitutes a trivial equivalent which is considered to be equally covered by the claims and description. Thus, the term "weight" is to be understood broadly as a classification figure for the estimated likelihood of the respective particle representing the mobile device location.

The weight of said particle resulting from the weighting can indicate an agreement of each particle with the adjacent topological path. In particular, after resampling of the particles according to their weights, the weighting scheme should give preference to particles strictly following a topological path direction but at the same time allows rapid adjustments to different measured headings of the mobile device to a different adjacent topological path. This approach is particularly effective in detecting turns, wherein, after a measured change of heading of the mobile devices, particles agreeing with an adjacent diverging topological path in the vicinity of the previous estimated position are weighted higher and thereby allow convergence of the estimated position of the device on the diverging topological path.

The convergence can be supported by the regeneration of particles around the current mean location of the plurality of particles according to a probability distribution taking into account a location uncertainty of the location estimate for the location of the mobile device estimated by said current mean location of the plurality of particles.

In preferred embodiments, said probability distribution is characterized by an uncertainty radius around the current mean location of the plurality of particles.

Preferably, the uncertainty radius is based on a current valuation of the reliability of the current estimate of the mobile device position, such as a function of the determined weights of the plurality of particles, and may dynamically change, in particular when the measured displacement direction poorly agrees with the path direction of adjacent topological paths.

While the uncertainty radius will be illustrated herein as a circle radius delimiting the regeneration area to better illustrate the weighting and resampling rules, the skilled person will appreciate that the uncertainty radius may also be implemented as a variance of a probability distribution around the current estimate of the mobile device position. Particles may then be regenerated according to the probability distribution, such that a predetermined portion (e.g., 68%, 95%, 99.9%, or all) of the regenerated particles are located within said uncertainty radius around the current estimate of the mobile device position, and adjacent topological paths may carry a weight based on a valuation of their distance to the current estimate of the mobile device position according to the probability distribution. For example, the uncertainty radius may be a standard deviation or a multiple of said standard deviation for a normal distribution around the current estimate of the mobile device position, and particles may be regenerated according to said normal distribution around the current estimate of the mobile device position. In principle, different interrelated uncertainty radii can be employed for the initial particle generation area and/or the particle regeneration area, such as uncertainty radii differing by a scaling factor for the regeneration area and for the determination of adjacent topological paths. However, for the sake of brevity, a single common uncertainty radius will be discussed in the following.

In preferred embodiments, the method further comprises adjusting the uncertainty radius based on a comparison of the particle displacement vector with the path direction of the adjacent topological path.

For example, the uncertainty radius may be reduced if a classification figure, which favors parallel alignment of the particle displacement direction with an adjacent topological path, is high, and may be increased if said classification figure is low. Said adjustment may be performed for each particle or may be performed for a subset of said particles, such as a subset of particles having higher weight than the other particles or the particle having the highest weight.

In preferred embodiments, the method further comprises adjusting the uncertainty radius based on at least one classification figure of the weights of a plurality of said particles, in particular based on a median, mean and/or sum of the weights of said plurality of particles, preferably all particles.

In some embodiments, the uncertainty radius is at least partially based on the number of intersections close to the (weighted) mean location of the plurality of particles, such as to increase the uncertainty radius in the proximity of turns or intersections. For example, the uncertainty radius may be based on a number of topological paths within a certain radius around the (weighted) mean location of the plurality of particles.

The dynamic adjustment of the uncertainty radius allows revising and correcting systematic measurement errors, such as a systematic error in the displacement distance leading to skipped intersections. In some embodiments, the number of particles for representing the current location of the mobile device depends on the uncertainty radius, and particles may be generated/deleted based on the current uncertainty radius, such as to invest additional processing power for resolving path splitting ambiguities, or in response to a low valuation of the reliability of the current estimated device position. However, in some embodiments, the particle number may also be fixed or limited to limit the processing power for tracking the mobile device.

In preferred embodiments, the adjacent topological path is a path at least partially lying within a circle around the current mean location of the plurality of particles, a radius of said circle depending on the uncertainty radius.

Thus, improbable topological paths can be disregarded for determining the weight of the plurality of particles, which can reduce the number of calculations for determining the weight, but may also allow the adjustment of the estimated mobile device position to a corrected path once the circle intersects a path matching the current measured heading of the mobile device.

In preferred embodiments, the adjacent topological path is the path which, during determining the weight for each particle, is associated with the highest weight for that particle.

Thus, close to intersections of topological paths, a plurality of probable topological paths within the uncertainty radius may be considered to determine the most likely adjacent topological path for each particle and the adjacent topological path may be different for different particles to allow for gradual ambiguity resolution.

The method can then select from said weighted particles a subset of lower weight particles for resampling, i.e., regeneration of said particles within a particle regeneration area around the current mean location of the plurality of particles according to said probability distribution for regenerating particles.

The selection rule of the subset of the displaced particles could in principle be arbitrarily chosen, however, some selection rules can improve resolving of position ambiguity. For example, the selection rule may provide a weight threshold, wherein particles having lower weight than said threshold may be resampled and/or a given fraction of said plurality of particles having lower or lowest weight may be resampled. The weight threshold and/or the fraction may further depend on the uncertainty radius, such as by selecting a larger subset (e.g., larger fraction) of particles when the uncertainty radius is large to increase the spread of particles in case of a low valuation of the reliability of the current estimated mobile device position and/or by providing a larger weight threshold when the uncertainty radius is large to allow the particles to propagate into walkable areas of the geographic area for which no topological paths have been recorded/generated. The selection rule may incorporate deterministic features, such as the weight threshold or the selection of the fraction of particles having lowest weight; but may also incorporate partially random elements, such as by picking, from said plurality of particles, at least a portion of said subset of particles based on a random choice, said random choice depending on the weight of the particle, wherein particles having higher weight are less likely to be picked.

The selected subset of particles can then be regenerated, in particular deleted and newly generated, within said particle regeneration area which preferably corresponds to a walkable area of said geographic area around the current mean location of the plurality of particles and which is preferably based on a circle around the current mean location of the plurality of particles whose radius depends on the uncertainty radius. In some embodiments, the particle regeneration area is contained in the uncertainty radius around the current mean location of the plurality of particles and the probability distribution may be selected, such that all regenerated particles are generated within said uncertainty radius. The current mean location of the plurality of particles may be a non-weighted or weighted mean location of the plurality of particles, wherein particles having higher weight also have a greater influence on the current mean location of the plurality of particles, and/or the current mean location may be determined after the selected subset of particles has been deleted. In some embodiments, the current mean location of the plurality of particles is represented by the location of a most likely representative of the current mean location of the plurality of particles, such as the particle having the highest weight, or is determined from a likely subset of particles, such as a weighted mean location of a subset of the particles having the highest weight. Thus, the current mean location of the plurality of particles is to be interpreted broadly as a representative of the most likely device location as determined from the weights and/or a spatial spread of the plurality of particles. Preferably, newly generated particles are statistically generated according to a (e.g., normal)

probability distribution around said current mean location of the plurality of particles having a variance depending on the uncertainty radius within said particle regeneration area. An initial particle displacement direction for said newly generated particles may be based on a weighted mean direction of the plurality of particles, e.g., the mean of the weighted directions of the non-selected particles, said weighted directions corresponding to the particle displacement directions weighted according to the weights of the respective particles, and the initial particle displacement may be partially randomized based on the direction uncertainty.

In preferred embodiments, the particle regeneration area is derived from an intersection of a circle around the current mean location of the plurality of particles, a radius of said circle depending on the uncertainty radius, and a walkable area, said walkable area being derived from the geometrical features of the virtual map, and/or from an intersection of said circle and a sleeve around said graph of topological paths, said sleeve defining a walkable area around each topological path with a path width associated to each topological path.

Restricting the particle regeneration area to walkable areas according to a map of the geographic area and/or to sleeves around topological paths can avoid placing particles inside of walls or equally inaccessible or improbable geographic areas, thus further reducing the required number of particles for tracking the mobile device.

In preferred embodiments, the method further comprises excluding, from said particle regeneration area for regenerating particles, geographic areas not having a topological connection to the current mean position of the plurality of particles and/or to a current most likely location of the device, wherein said topological connection is in particular restricted to an area of a circle around the current mean position of the plurality of particles depending on the uncertainty radius, preferably excluding geographic areas which are topologically connected to the current mean location of the plurality of particles via a shortest topologically connection having a connection distance which is larger than a distance threshold, said distance threshold being based on the uncertainty radius.

A likely error for dead reckoning device tracking methods can be teleportation of particles through walls (e.g., generation of a particle on the other side of a wall). This problem can be aggravated in the presence of a topological path matching the direction of the measured displacement vector on the other side of said wall. Thus, geographic areas not having a topological connection to a current estimated mobile device location should be excluded from the particle regeneration area. Since the uncertainty radius can represent a current valuation of the reliability of the current estimated mobile device position, its value can be used to estimate the presence of a topological connection. For example, only geographical areas topologically connected within the circle defined by the uncertainty radius around the current (weighted) mean position of the plurality of particles may be included in the particle regeneration area. Similarly, a dynamic distance threshold may be used to exclude potential particle regeneration areas within the uncertainty radius. The estimated distance of the current mean location of the plurality of particles may be derived from a distance via the closest topological path connecting the current mean location of the plurality of particles to the potential particle regeneration area. However, other methods may equally be used, such as excluding geographical areas whose direct connection to the current mean location intersects a wall according to a layout of the geographic area.

After the subset of displaced particles has been regenerated, the method may continue to iteratively repeat steps c) to g) of the method according to the first aspect, thereby iteratively determining a measured displacement vector and therefrom determining particle displacement vectors, and weighting as well as resampling the particles, i.e., selecting and regenerating a subset of displaced particles, such as to propagate the most likely particles on the virtual map of the geographic area.

In preferred embodiments, the method comprises periodically repeating steps c) to g) for tracking the mobile device, wherein a current estimated position of the mobile device is approximated as the current mean location of the plurality of particles or is derived therefrom.

Thus, the estimated position of the mobile device can be tracked with the propagation of the particles wherein the weighting of the plurality of particles according to an agreement with topological (semantic) paths can replace cloud-computation-based statistical analysis of a path history due to the reduced computational load. In particular, determining a weight of each particle and resampling said particles may be performed on the mobile device based on the reduced number of particles required in the computational steps.

In preferred embodiments, said number of particles is lower than 1000, in particular lower than 400, preferably lower than 200, most preferably lower than 100.

In preferred embodiments, the method further comprises receiving a location signal for the mobile device and an associated uncertainty for the location signal, and adjusting the weight of each particle based on the location signal and the associated uncertainty for the location signal.

For example, the mobile device may receive a GPS- or similar locating signal and a weight of each particle may be adjusted based on a probability (normal) distribution around the location signal, wherein the variance of the probability distribution is given by the associated uncertainty for the location signal.

In some embodiments, the mobile device may receive the locating signal from an external device wherein the locating signal is based on a probe signal emitted wirelessly by the mobile device. In some embodiments, the mobile device periodically generates the probe signal and receives one or more localization components associated with the probe signal or a locating signal associated with the probe signal, wherein the localization components or the locating signal may be generated based on properties of the probe signal received by one or more external devices located in the geographical area.

In preferred embodiments, the method further comprises determining a geographic context, in particular a characteristic vertical and/or stopping and/or acceleration motion, of the device from the series of motion measurements, preferably by mapping one or more subsequent measured displacement vectors to a motion model of a human operator traversing said geographic area and/or interacting with a mapped object in said geographic area, deriving a location signal and an associated location uncertainty from said geographic context, and adjusting the weight of each particle based on the location signal and the associated uncertainty for the location signal and/or adjusting the uncertainty radius based on the geographic context.

Geographic contexts can be derived from the motion measurements, such as by detecting stair movements, escalator and/or elevator movements, interaction with doors, or the like, and may further be derived from additional sensors, such as magnetometers, barometers, or light sensors (e.g., a camera or a luminosity sensor of a mobile device). For example, based on the detection of a stair movement, the method may comprise providing potential stair locations within the geographic area and generating one or more location signals associated with said potential stair locations. The detection of the geographic context may at least partially be performed by a neural network, such as a support vector machine, which can be trained with characteristic mobile device sensor patterns for one or more of climbing stairs, descending stairs, riding an elevator, walking, standing, sitting, or the like. The geographic context locations may be generated as part of the grammar of the map, such as by identifying stairs, escalators, elevators, doors, etc., in a map of the geographic area and accordingly generating the geographic context locations for the geographic area at the respective location.

In preferred embodiments, the method further comprises comparing the associated uncertainty for the location signal with the uncertainty radius, and if the associated uncertainty for the location signal is smaller than the uncertainty radius by a given threshold, resampling a portion of said plurality of particles, in particular all particles, in a particle regeneration area around the location signal, in particular a radius around said location signal, said radius given by the associated uncertainty for the location signal, and adjusting the uncertainty radius based on the associated uncertainty for the location signal.

For example, if a location uncertainty associated with a GPS location determination is lower than the uncertainty radius, the particle tracking method may be reinitialized at the determined location signal with the initial uncertainty radius given by the uncertainty of the GPS location signal. Similarly, if a geographic context, such as a stair movement, is detected and a context candidate location for said geographic context is located within a context recognition circle whose radius depends on the uncertainty radius, the particle tracking method may be at least partially reinitialized at the context candidate location and the uncertainty radius may be reduced and/or reinitialized in accordance with the associated uncertainty of the context candidate location. By restricting the weighting according to detected geographic contexts to candidate context locations within said context recognition circle, the impact of erroneous geographic context detection on the estimated position of the mobile device can be reduced.

In preferred embodiments, the method further comprises comparing the associated uncertainty for the location signal with the uncertainty radius, and if the associated uncertainty for the location signal is smaller than the uncertainty radius, determining intersecting paths with respect to the location signal, said intersecting paths lying in or intersecting a particle regeneration area within a radius around the location signal, the radius given by the associated uncertainty for the location signal, and if no intersecting path is determined, generating a new path segment at the location signal, wherein said new path segment is preferably associated with the displacement direction of the measured displacement vector.

Thus, if a location signal indicates a mobile device position outside of the sleeve around topological paths in the geographic area, a new topological path may be generated at the location signal, wherein a path direction of the topological path may be initialized as the current estimated displacement direction for the device. In this way, geographic areas which have not been mapped with topological paths going through said geographic area can be dynamically mapped. A plurality of historic measurements of one or more different devices traversing said geographic area may later be consolidated by a server to update and/or refine the topological paths through the previously unmapped geographic area.

The skilled person will appreciate that the method of the first aspect may be implemented fully or at least partially by the mobile device. However, at least some or all of the steps may also be implemented externally to the mobile device, such as executed by a server connected to the mobile device via a communication path. In some embodiments, at least one external processing device receives the series of motion measurements of said mobile device and implements the method for tracking the mobile device. According to a second aspect, the invention relates to a navigation system for tracking a mobile device in a geographic area. Said navigation system is configured to:

a) store or receive a topological map for said geographic area, said topological map providing a graph of topological paths through said geographic area, wherein each topological path is associated with a corresponding path direction;

b) statistically generate, on a virtual map of said geographic area, a plurality of particles around an estimated initial position of the mobile device, a spatial dispersion of said particles representing an initial uncertainty of said estimated initial position of the mobile device;

c) measure a series of displacements of said mobile device or receive a series of motion measurements of said mobile device and therefrom determine a measured displacement vector comprising an estimated displacement direction and an estimated displacement distance of the mobile device;

d) displace each of said particles on the virtual map according to a randomized particle displacement vector which is derived from said measured displacement vector based on an uncertainty of the measured displacement vector and recording said particle displacement vector for each displaced particle;

e) determine a weight of each particle based on a comparison of the respective particle displacement vector and of the path direction of an adjacent topological path and/or based on a distance of the particle to the adjacent topological path;

f) resample the plurality of particles, wherein the system is configured to select a subset of said displaced particles for resampling based on a particle-weight dependent selection criterion, wherein said selection criterion is such that particles with lower weight are more likely to be resampled than particles with higher weight; and g) wherein the system is further configured to regenerate said selected subset of displaced particles within a particle regeneration area around a current mean location of the plurality of particles according to a probability distribution.

In preferred embodiments, the system is a mobile device and comprises motion measurement sensors for measuring a motion and/or a location of the mobile device, in particular one or more of a gyroscope, a compass, a barometer, a light sensor, an RF receiver, a magnetometer and an accelerometer, integrated with the mobile device.

In preferred embodiments, said probability distribution is characterized by an uncertainty radius around the current mean location of the plurality of particles.

In preferred embodiments, the system is further configured to determine, based on said series of motion measurements, the uncertainty of the measured displacement vector of the mobile device.

In preferred embodiments, the uncertainty of the measured displacement vector comprises an uncertainty of the estimated displacement direction, and wherein the system is configured to statistically generate a displacement direction for each of said particles according to a probability distribution based on said uncertainty of the estimated displacement direction to displace each of said particles.

In preferred embodiments, the system is further configured to adjust the uncertainty radius based on the comparison of the particle displacement vector with the path direction of the adjacent topological path.

In preferred embodiments, the system is further configured to adjust the uncertainty radius based on at least one classification figure of the weights of a plurality of said particles, in particular based on a median, mean and/or sum of the weights of said plurality of particles, preferably all particles.

In preferred embodiments, the adjacent topological path is a path at least partially lying within a circle around the current mean location of the plurality of particles, a radius of said circle depending on the uncertainty radius.

In preferred embodiments, the system is configured to determine, for each particle, a weight for each adjacent topological path to form particle weight candidates for said particle and wherein the system is further configured to attribute the highest weight from the particle weight candidates to that particle.

In preferred embodiments, the particle regeneration area is derived from an intersection of a circle a circle around the current mean location of the plurality of particles, a radius of said circle depending on the uncertainty radius, and a walkable area, said walkable area being derived from the geometrical features of the virtual map, and/or from an intersection of said circle and a sleeve around said graph of topological paths, said sleeve defining a walkable area around each topological path with a path width associated to each topological path.

In preferred embodiments, the system is further configured to exclude, from said particle regeneration area for regenerating particles, geographic areas not having a topological connection to the current mean position of the plurality of particles and/or to a current most likely location of the device, wherein said topological connection is in particular restricted to an area of a circle around the current mean position of the plurality of particles depending on the uncertainty radius, preferably exclude geographic areas which are topologically connected to the current mean location of the plurality of particles via a shortest topologically connection having a connection distance which is larger than a distance threshold, said distance threshold being based on the uncertainty radius.

In preferred embodiments, the system is further configured to receive a location signal for the mobile device and an associated uncertainty for the location signal, and adjust the weight of each particle based on the location signal and the associated uncertainty for the location signal.

In preferred embodiments, the system is further configured to determine a geographic context, in particular a characteristic vertical and/or stopping and/or acceleration motion, of the device from the series of motion measurements, preferably by mapping one or more subsequent measured displacement vectors to a motion model of a human operator traversing said geographic area and/or interacting with a mapped object in said geographic area, derive a location signal and an associated location uncertainty from said geographic context, and adjust the weight of each particle based on the location signal and the associated uncertainty for the location signal and/or adjust the uncertainty radius based on the geographic context.

In preferred embodiments, the system is further configured to compare the associated uncertainty for the location signal with the uncertainty radius, if the associated uncertainty for the location signal is smaller than the uncertainty radius by a given threshold, regenerate a portion of said plurality of particles, in particular all particles, in a particle regeneration area around the location signal, in particular a radius around said location signal, said radius given by the associated uncertainty for the location signal, and adjust the uncertainty radius based on the associated uncertainty for the location signal.

In preferred embodiments, the system is further configured to compare the associated uncertainty for the location signal with the uncertainty radius, if the associated uncertainty for the location signal is smaller than the uncertainty radius, determine intersecting paths with respect to the location signal, said intersecting paths lying in or intersecting an approximate area of the device within a radius around the location signal, the radius given by the associated uncertainty for the location signal, and if no intersecting path is determined, generate a new path segment at the location signal, wherein said new path segment is preferably associated with the displacement direction of the measured displacement vector.

In some embodiments, the system implements and/or executes the method steps of any one of the embodiments of the method according to the first aspect.

In some embodiments, the navigation system is fully or at least partially implemented in a portable mobile device. However, in some embodiments, at least some of the functions of the navigation systems may also be executed by a server or by a cloud of computing units connected to the mobile device. In some embodiments, the navigation system is fully implemented on a server connected to the mobile device.

In a third aspect, the invention relates to a computer program or computer program product comprising machine readable instructions, which when the computer program is executed by a processing unit cause the processing unit to implement a method according to any one of the embodiments of the first aspect and/or to implement and/or to control a system according to any one of the embodiments of the second aspect.

The machine readable instructions of the computer program or computer program product may be stored on a non-transitory machine-readable storage medium to be accessed by the processing unit.

BRIEF DESCRIPTION OF THE SEVERAL VIEWS OF THE DRAWINGS

The features and numerous advantages of the method, computer program and system according to the present invention will best be understood from a detailed description of preferred embodiments with reference to the accompanying drawings, in which.

DETAILED DESCRIPTION OF EMBODIMENTS

Figure 1:
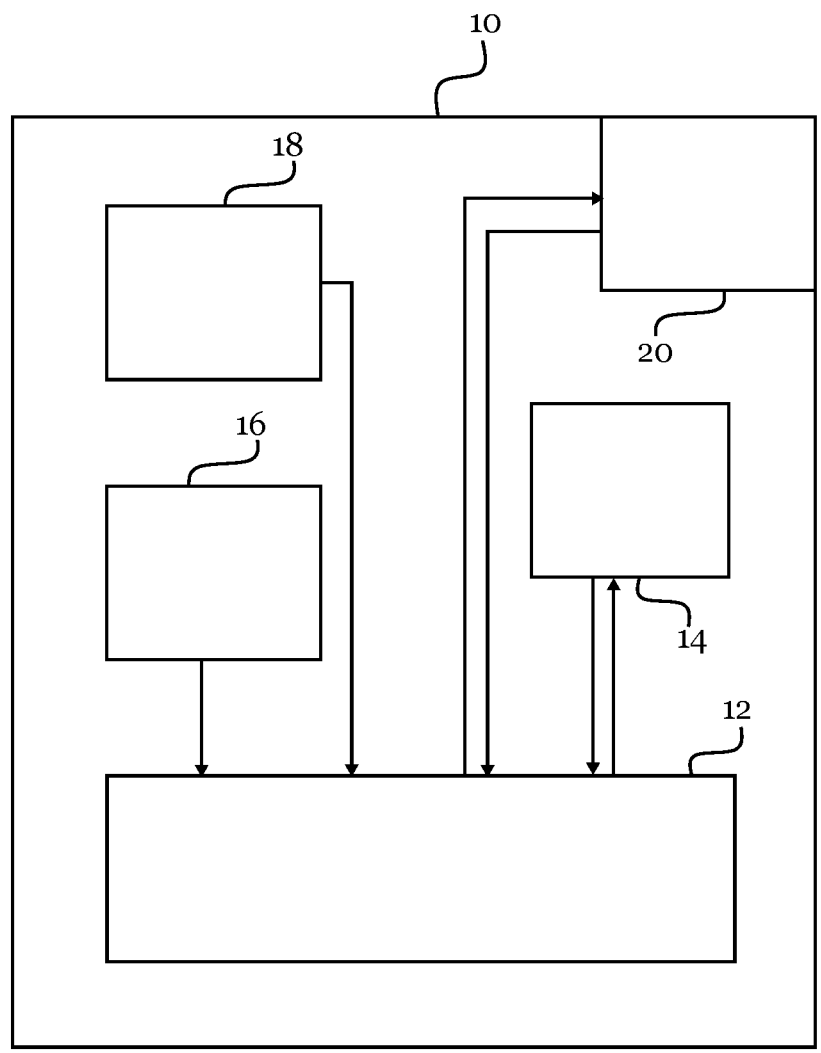
FIG. 1 schematically shows an example of a mobile device.

FIG. 1 illustrates components of a mobile device 10 according to a schematic example. The mobile device 10 comprises a processing unit 12 configured to track a spatial motion of the mobile device 10 through a geographic area, a storage 14 coupled to said processing unit 12, motion sensors 16, a location sensing assembly 18, and a communication module 20 to provide a communication link to the mobile device 10.

Maps of geographic areas can be stored and retrieved from the storage 14 and/or may be retrieved with the communication module 20 from an external source, such as the Internet or a local map provider providing map information via a local network. As part of the maps of geographic areas, the mobile device 10 can retrieve and store topological maps of geographic areas, said topological maps providing a plurality topological paths traversing said geographic area and associated grammars, such as the width of said topological paths.

The motion sensors 16 are configured to measure accelerations and/or displacements and may for example comprise a magnetometer, gyroscope and an accelerometer, such as microelectronics/MEMS sensors commonly integrated in a smartphone, but may also comprise one or more of a light sensor, an RF receiver, a wheel counter and a compass, or similar sensors known in the art which can be integrated with the mobile device 10. In particular, the motion sensors 16 may comprise a barometer and the processing unit 12 may be configured to calculate a derivative of a measured value of the barometer to estimate z-axis movement, e.g., up-and-down movement between different levels of a building, or estimate a height with respect to ground level based on absolute value of the barometer to determine the current floor at which the mobile device 10 is located.

The processing unit 12 can then be configured to consolidate a plurality of measurements of the motion sensors 16 and/or to integrate measured accelerations of the mobile device 10 to infer a most likely displacement and a corresponding uncertainty for the most likely displacement. As part of said consolidation, the processing unit 12 may map the plurality of measurements of the motion sensors 16 to a motion model for that mobile device 10, such as a motion model of a human operator carrying the mobile device 10 and performing a characteristic motion, such as a step.

The processing unit 12 can further receive location signals from the location sensing assembly 18 to directly determine a location of the mobile device 10 based on a signal from one or more spatial references, such as GPS satellites or Wi-Fi routers, but may also comprise light sensors configured to detect a location specific light pattern or location specific luminescence (e.g., characteristic window sequence or lamp assembly), magnetometers configured to detect specific magnetic field patterns, a combination thereof or the like. Additionally, an absolute location of the mobile device 10 may be inferred from a camera image taken with a camera integrated with the mobile device 10, when a characteristic location and corresponding relative position to said characteristic location can be detected in the camera image. Moreover, signals from external devices coupled to the mobile device 10 may be collected and used for providing a motion measurement, e.g., a signal from internal sensors of a smartwatch.

The processing unit 12 can then be configured to consolidate said measurements of motion and absolute location provided by the motion sensors 16 and the location sensing assembly 18 by performing an appropriate location estimation method for tracking the mobile device 10.

Figure 2:
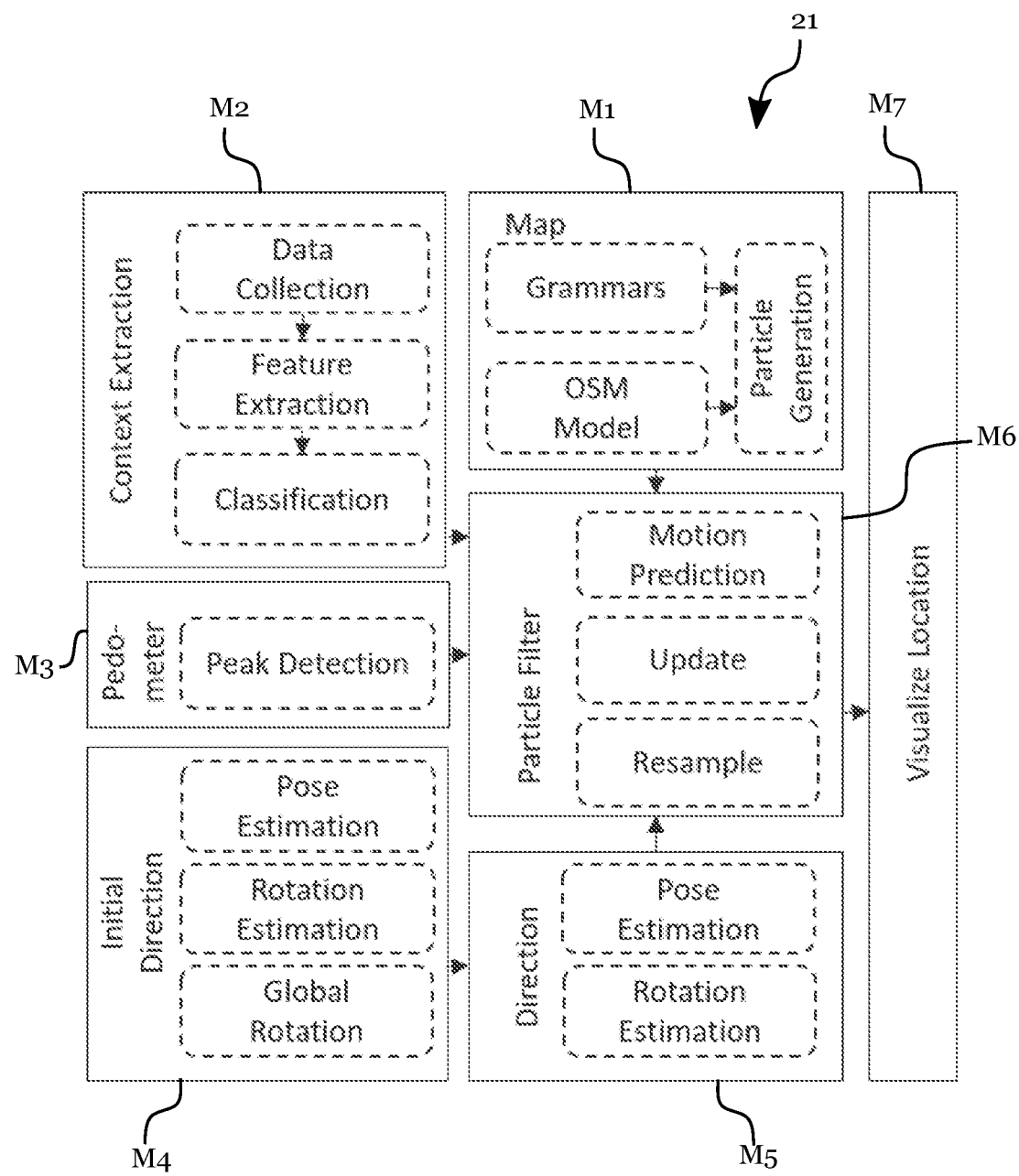
FIG. 2 illustrates a schematic locating module for a mobile device according to an example.

FIG. 2 illustrates a locating module 21 according to an example which may be implemented by the processing unit 12 of the mobile device 10 depicted in FIG. 1. The locating module 21 is subdivided into several submodules solely for better illustration, but the structure of the locating module 21 may also be further subdivided and/or some of the submodules may be combined in embodiments without intending any limitation.

A mapping module M1 can retrieve grammars for a graph of topological paths from a repository, such as an open street maps (OSM) model, to generate a virtual map for the generation of particles. A context extraction module M2 can collect data from motion sensors 16 and location sensing assembly 18, and in particular from accelerometers, magnetometers and pressure sensors of the motion sensors 16, which is filtered and segmented for feature extraction, and extracted features may be classified by a classifier, e.g., a trained neural network to determine the current state of the mobile device 10, such as an activity the mobile device 10 is involved in (e.g., walking, climbing stairs, using an escalator, etc.). A pedometer M3 may consolidate the measurements of the motion sensors 16 to detect and evaluate characteristic peaks or periodicities in the motion sensors. An initial direction module M4 may extract the user's global direction by consolidating measurements of the acceleration, magnetometer, gyroscope sensors and/or pedometer M3, while direction module M5 may extract a global direction and/or direction differences by consolidating measurements of the magnetometer accelerometer and/or gyroscope sensors and/or an output of the pedometer M3. The particle filtering module M6 may receive data from the modules M1 to M5 and may consolidate the data for motion prediction, updating of the initialized particle locations and resampling of the particles. A visualization module M7 can infer a most likely position of the mobile device 10 and may generate an associated map section with an indication of said most likely position for a user of a mobile device 10.

The mapping module M1 can be configured to retrieve a map of the area of interest, such as a publicly available map of a building, e.g., an Open Street Map (OSM) providing map data using a data model to represent elements of the physical world, such as buildings, roads, corridors, etc. This data can be dynamically retrieved and can be used to identify the elements that exist within an area of the physical world as well as their geometry. The mapping mobile M1 may parse this data and identify those elements that can be used for routing, such as stairs, corridors, pathways, which are stored separately and are later used for localization. The mapping module M1 may further enhance retrieved map elements, such as stairs, corridors, elevators, escalators, entrances, etc., which often can be oversimplified and inaccurate representations of the physical world, using established standards. For example, the corridors inside the buildings are often represented using a single line (one-dimensional representation). Preferably, a width is added to the lines by assuming that the lines conform to the standards regarding the minimum width of corridors for providing more accurate localization in two dimensions and/or by inferring a corridor width from a building layout, such that the grammar may provide width information for topological paths of the graph. Similar modifications to elements can increase the detail of the maps and the overall accuracy of the localization in view of the often limited information provided in an OSM.

The initial direction module M4 may use the mobile device's 10 accelerometer and magnetometer to calculate the mobile device's 10 pose and later the rotation matrix, which includes the roll, pitch and yaw. Using the accelerometer, the mobile device's 10 pose can be extracted by calculating the direction of the gravity vector, which may be approximated during motion as the orientation of the acceleration sensor which measured the highest median value during a preceding measurement interval (e.g., the z-, x-, or y-axis of the device). Once the gravity vector has been calculated or estimated, the user's heading direction can be calculated from the magnetometer data. Due to the uncertainty of the magnetic sensor this estimation should then be corrected and improved based on map context, such as the direction of building edges, and later localization, e.g., based on two consecutively received location signals.

The direction module M5 may then estimate a current heading direction of the mobile device 10 by integrating data from the motion sensor 16 and/or based on information of the pedometer M3. Human motion noise may be filtered, such as by a 1 Hz low pass filter, and a combination of acceleration and gyroscope sensor values may be integrated over a (sliding) sampling time window, for example having a window length of 1 s or a length similar to a common human step duration, to determine a heading estimate. However, measured sensor data, and in particular measured gyroscope data, may equally be used to estimate a turn rate, which may be used to modify a previous heading direction. For example, once the gyroscope and accelerometer readings have been filtered, the angular velocity may be computed by estimating the magnitude $G_m(t)$ of the three gyroscope axes, $G_m(t)=\sqrt{G_x(t)^2+G_y(t)^2+G_z(t)^2}$, wherein $G_x(t)$, $G_y(t)$ and $G_z(t)$ are the turn rates of each individual axis, at time t. A positive or negative sign may be attributed to the values to indicate whether there is a right or left turn respectively. The gravity direction may be approximated by the maximum value $A_m=\max(A_x; A_y; A_z)$, where $A_x$, $A_y$, $A_z$, are the median accelerometer values during the sliding window along axes x, y and z respectively. Finally, the walking direction can be estimated by integrating over the estimated gyroscope magnitude $G_m$. In particular, the gyroscope magnitude $G_m$ may be computed based on the components of the measured gyroscope magnitude perpendicular to the gravity vector, such as to obtain a gyroscope magnitude about the gravity vector, to determine changes of the displacement direction.

The pedometer M3 may detect steps based on the data from the motion sensors 16, such as the accelerometer. The detection of a step may then be converted to a displacement distance via a step length, such as an average human step length between 0.6 m and 0.9 m, e.g., 0.7 m, and/or a user specific step length stored in the mobile device 10, and may be based on a user specific step length modifier derived from a movement history of the mobile device 10. An occurrence of a step may be detected based on the repetitive pattern caused in the accelerometer from the human bipedal movement. Additionally, in a peak detection module, unique patterns, which are caused by the action when heal strikes the ground and are reflected in the acceleration sensor data, can be taken into consideration. Accelerometer data for the peak detection can be collected from three axes of the accelerometer [X; Y; Z] and a single magnitude axis may be derived therefrom according to $A_m=\sqrt{A_x^2+A_y^2+A_z^2}$. The acceleration magnitude $A_m$ may then be time-averaged in a segment of data, in particular a segment longer than at least one average human step duration, such as 3 seconds, and the average value over the segment can be subtracted from the raw values, to exclude the influence that other sources of acceleration have in the data, such as the acceleration of the Earth gravity. The corrected data may then be used for pattern recognition and/or peak detection to detect steps. The data may further be used to derive or correct the displacement distance based on a motion model and/or reference values, for example using a peak amplitude and/or peak rate of the corrected data and comparing the peak amplitude and/or peak rate with reference values associated with a certain step length.

The virtual map incorporating a graph of topological paths as well as retrieved and/or generated grammars for said topological paths can then be used for tracking the mobile device 10. Initially, a set of randomly positioned particles $S_t^k=[X_j^k;W_j^k]$ may be generated on the map, where $X_j^k$ is the jth particle at time k and $W_j^k$ is the normalized weight of the particle, such as according to a probability (normal) distribution representing the initial knowledge on the position of the device 10. The plurality of particles may then represent an initial discretized probability distribution of a location estimate of the mobile device 10. For the placement of said particles, the mapping module M1 may divide the areas covered by the map elements into small rectangles, wherein each rectangle may be represented by its center position characterized by its GPS coordinates. The result can be a dense layer of positions that may cover the areas where a person can be located and which can be available for particle placement.

Each particle of the plurality of $N_p$ particles may be represented by a state vector $X_k=[x_k, y_k, \theta_k]^T$ at time-step k. Assuming a first-order hidden Markov model, the posterior filtered density $p(x_k|z_{0:k})$ for the tracked position can be approximated as $$p(x_k|z_{0:k}) \approx \sum_{j=1}^{N_p} w_k^{(j)} \delta(x_k - x_k^{(j)}), \quad (1)$$

where $z_{0:k}$ defines the measurement vector for the time steps $0, \ldots, k$, $\delta$ stands for the Dirac distribution, $x_k^{(j)}$ denotes particle state and $w_k^{(j)}$ denotes the normalized weight.

The particles can be displaced according to a predicted motion using a particle displacement vector represented in two dimensions as $[\Delta x, \Delta y]^T$, including a displacement $\Delta x$ along the x-direction of a coordinate system and a displacement $\Delta y$ along a y-direction of a coordinate system. Said particle displacement vector may include a dead reckoning component which can be approximated based on an estimated displacement distance $\rho$ and an estimated displacement direction $\hat{\theta}_{k-1}$ as the particle displacement vector $[\rho \cos \hat{\theta}_{k-1}, \rho \sin \hat{\theta}_{k-1}]^T$, such that a new particle state vector after displacement may be calculated according to $$\begin{bmatrix} x_k \\ y_k \\ \theta_k \end{bmatrix} = \begin{bmatrix} x_{k-1} + \rho\cos\hat{\theta}_{k-1} \\ y_{k-1} + \rho\sin\hat{\theta}_{k-1} \\ \hat{\theta}_{k-1} \end{bmatrix}, \quad (2)$$

wherein $x_k/x_{k-1}$ and $y_k/y_{k-1}$ are the x- and y-coordinates of the particle location at time step $k/k-1$, respectively, wherein $\theta_k$ is the updated particle displacement direction for said particle at step k, and wherein the estimated displacement direction $\hat{\theta}_{k-1}$ may be calculated as $\hat{\theta}_{k-1} = \hat{\theta}_{k-1} + \delta\theta$ based on a previously stored displacement direction $\theta_{k-1}$ at time step k−1 and a measured rotation $\delta\theta$ of the mobile device 10, such as a measured rotation $\delta\theta$ inferred from measurements of the motion sensors 16, in particular gyroscope sensors, by the direction module M5, an estimated displacement direction $\hat{\theta}_{k-1}$ determined from said measurements of the motion sensors 16, or a combination thereof. The estimated displacement distance $\rho$ may be determined from the pedometer M3 output and/or from a current activity recognized by the feature extraction module M2. As part of the motion prediction, the processing unit 12 may fit the displacement direction to an edge of the map (e.g., a building edge) and should generate an at least partially randomized particle displacement vector for each particle based on a Gaussian distribution for the displacement direction and/or the displacement distance, wherein a variance of the Gaussian distribution should represent an uncertainty of the estimated displacement direction and of the displacement distance, respectively.

The particle filtering module M6 may then propagate and subsequently update the particle weight of each particle based on a comparison of the respective particle displacement vector with the path direction of an adjacent topological path, such as by calculating a scalar product of the particle displacement vector and the path direction or a comparison based on the heading difference $\theta_{diff}$, e.g., by updating the weight $w_k$ of a given particle according to $w_k = 2*w_{k-1}*(1-2*\theta_{diff}/\pi)$, wherein $\theta_{diff}$ is the difference of a polar angle associated with the path direction and the particle displacement vector in a polar/spherical coordinate representation. An updated weight may also be based on a distance of the particle to the adjacent topological path, such as by calculating the weight according to a Gaussian distribution around the adjacent topological path. The adjacent topological path may be one of the topological paths within a circle defined by an uncertainty radius around a current mean location of the plurality of particles. If more than one topological path is located within the circle defined by the uncertainty radius around the current mean location of the plurality of particles, a plurality of candidate weights may be calculated for each adjacent topological path and the highest candidate weight may be attributed to said particle.

A set t of M particles $S_t^k = [X_j^k, W_j^k]$, wherein $X_j^k$ is a state vector representing the jth particle at time k, may then be used to derive a position estimate for the mobile device 10. For example, a position estimate for the mobile device 10 may be a weighted mean location $P_{est} = [\Sigma_{j=1}^M w_j x_j, \Sigma_{j=1}^M w_j y_j]^T$, a highest-weight particle $w_k = \max(w_k^j)$, or a combination thereof, such as a weighted mean location $P_{est}$ of a subset t of particles in an area around the highest-weight particle $w_k$.

The updated particles can then be resampled, such as by culling (deleting) low weight particles and regenerating new particles around the position estimate for the mobile device 10 according to a normal distribution characterized by an uncertainty radius. Particles may be selected for regeneration based on the absolute value of the weight attributed to them during the updating and/or based on a relative weight with respect to the weight of the other particles of the particle set. Particles selected for regeneration may thus be deleted and a new particle may be generated within a circle defined by the uncertainty radius around the position estimate for mobile device 10. Preferably, a particle regeneration area available for regenerating particles can be restricted based on sleeves around topological paths, wherein said sleeves are defined by a width of the corresponding topological path, such as the width of the corridor.

An absolute value for the weight of each particle may further be used to adjust an uncertainty radius associated with a current state estimate. In other words, the uncertainty radius may decrease, when a particle substantially follows an adjacent topological path, and may increase when a particle substantially deviates from potential topological path candidates within the uncertainty radius due to the predicted motion, such as to dynamically adjust a particle regeneration area available for regenerating particles based on a valuation of the reliability of the current estimate state vector, wherein the valuation can be conveniently represented by the uncertainty radius.

In addition to the weighting of the plurality of particles based on the a comparison of the respective particle displacement vector with the path direction of an adjacent topological path and/or based on the distance of the particle to the adjacent topological path, the context extraction module M2 may provide location context for updating the particle weights and/or for updating the uncertainty radius associated with the current state estimate. For example, the feature extraction module M2 may be configured to detect an activity of a human operator and classify it according to an activity set comprising one or more of sitting, standing, walking, walking upstairs, walking downstairs, using the elevator up, and using the elevator down.

The feature extraction module M2 may use one or more of the following axes of (pre-processed/filtered) gyroscope sensor data, (pre-processed/filtered) acceleration sensor data, gyroscope magnitude data as described above, the interquartile range of the acceleration sensor data, gyroscope sensor data as well as pressure sensor data within a sliding data segment. The feature extraction module M2 may further use a covariance $\sigma$ between different axes of the acceleration and/or gyroscope sensors within a data segment n, such as according to $$\sigma = \frac{1}{n}\sum_{i=1}^{n}(x_i - \overline{X})(y_i - \overline{Y}),$$

wherein $\overline{X}$, $\overline{Y}$ are means of vectors $x_i$, $y_i$ representing the measured (filtered/pre-processed) data segment of a corresponding measurement axis, with i indicating an observation. In addition, the feature extraction module M2 may calculate a pressure derivative $$PRE' = \frac{-1}{n} \sum_{k=1}^{n-1} k'(x)$$

in a sample window n, wherein $$k'(x) = \frac{x(k) - x(k-1)}{\Delta t},$$

with $\Delta t$ being a time between two samples x(k) of a pressure sensor at time k. The sample window n may correspond to a duration characteristic for human motion which can be characteristic for a given activity, such as climbing one or more stairs by a human operator.

A classifier of the feature extraction module M2 may then use the extracted features of averaged and/or filtered sensor data, covariance of sensor data axes and/or pressure derivative data to determine a current activity. Preferably, a neural network is trained with extracted features from sensor histories of a human carrying the mobile device 10 and a corresponding activity chart to recognize the current activity.

The particle filtering module M6 may then use the determined current activity and correlate the current activity with corresponding geographic locations (such as the geographic location of an elevator) to derive a geographic context for refining the current state estimation and/or update the uncertainty radius. For example, if one or more geographic contexts are located within a circle defined by the uncertainty radius around the current (weighted) mean location of the plurality of particles and/or the current estimated mobile device location, the particles may be reweighted based on a probability distribution around the geographic context, wherein the variance of the probability distribution may depend on a classification uncertainty and/or on a spatial uncertainty for the geographic context, such as a spatial extent of an elevator, and the uncertainty radius may be decreased. If no geographic context is located within said circle, the uncertainty radius may be increased, wherein an increase of the uncertainty radius may be based on a classification uncertainty for the activity.

In a preferred embodiment, the feature extraction module M2 uses one or more of a pressure derivative, an interquartile range of the acceleration magnitude, and a covariance of the lateral axes of the acceleration sensor, said lateral axes being calculated and/or chosen from the acceleration sensor data based on the current estimated direction of the gravity vector. In particular, the pressure derivative may improve detection of a height-context, such as a start of a sitting activity, stair movement, escalator movement and/or elevator movement. The covariance of the lateral axes of the acceleration may improve detection of walking and/or climbing stairs activities.

The Inventors found satisfactory prediction rates for these exemplary contexts by using the interquartile ranges of accelerometer X, Y- and Z-axis sensors, an interquartile range of the accelerometer magnitude axis, the mean values of the accelerometer sensor data of the X-, Y-, and Z-axis, and the accelerometer magnitude axis, a covariance of a magnitude of accelerometer data between the X- & Y-axes, X- & Z-axes, and Y- & Z-axes, the pressure derivative, and the interquartile range of the pressure data within a preceding measurement segment of sensor data as input data for a neural network and by training the neural network using sensor data with corresponding timestamped activity contexts for the activities of sitting, standing, walking, stair movement (up/down), and elevator movement (up/down). The skilled person will however appreciate that depending on the set of activities, other sensor data can be further provided, and that only a subset of the above input data may be used to infer a current activity.

Operating said locating module 21 may then allow tracking a mobile device 10 based on the iterative displacement of virtual position candidates (i.e., the particles) through a virtual map according to the available location and motion data.

Figure 3:
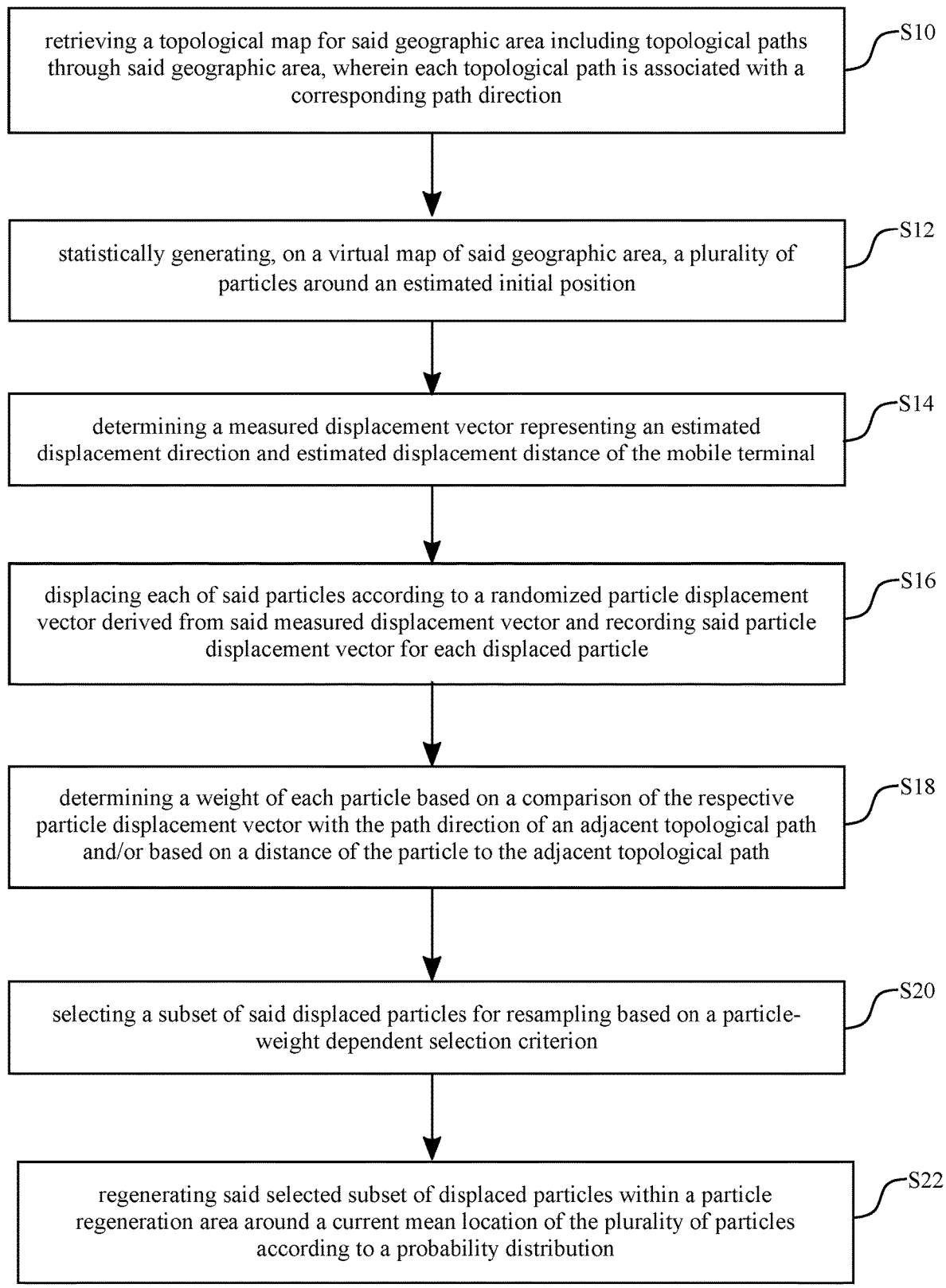
FIG. 3 illustrates a flowchart of a method for tracking a mobile device according to an example.

FIG. 3 illustrates a flowchart of a method for tracking a mobile device 10 according to an example, which may use or at least partially implement functionalities of the locating module 21 described above. The method comprises retrieving a topological map for said geographic area including topological paths through said geographic area, wherein each topological path is associated with a corresponding path direction (step S10). The method further comprises statistically generating, on a virtual map of said geographic area, a plurality of particles around an estimated initial position (step S12). Said plurality of particles may represent a discretized probability distribution around said estimated initial position, wherein each particle can be considered a location candidate for the mobile device 10. The estimated initial position may be based on a measurement provided by the location sensing assembly 18 of the mobile device 10.

Starting from said initial estimated position, the method comprises determining a measured displacement vector representing an estimated displacement direction and estimated displacement distance of the mobile device 10 (step S14), which may be derived from measurements of the motion sensors 16, wherein each of the displacement direction as well as displacement distance may be associated with a corresponding uncertainty. The method further comprises displacing each of the particles according to a randomized particle displacement vector derived from said measured displacement vector and recording said particle displacement vector for each displaced particle (step S16).

Thus, the plurality of particles, or in other words particle cloud, is displaced on the virtual map based on the measured displacement vector, wherein the displacement of each particle is at least partially randomized, wherein the degree of randomization may at least partially depend on the uncertainty associated with the measurement of the motion sensors 16 of the measured displacement vector. Effectively, this can lead to a spreading out of the particle cloud as part of the displacement.

The method further comprises determining a weight of each particle based on a comparison of the respective particle displacement vector with the path direction of an adjacent topological path and/or based on a distance of the particle to the adjacent topological path (step S18), and selecting a subset of said displaced particles for resampling based on a particle-weight dependent selection criterion (step S20). Furthermore, the method comprises regenerating said selected subset of displaced particles within a particle regeneration area around a current mean location of the plurality of particles according to a probability distribution (step S22).

Thus, to counteract a spreading of the particle cloud due to the uncertainty of the measured displacement vector, the method provides a weighting and resampling criterion to disregard improbable particle locations. This resampling favors particles remaining close to the topological paths, thereby controllably reducing the spreading of the particle cloud due to the uncertainty of the measured displacement vector based on the topology of a geographic area with relatively little computational effort.

Figure 4A:
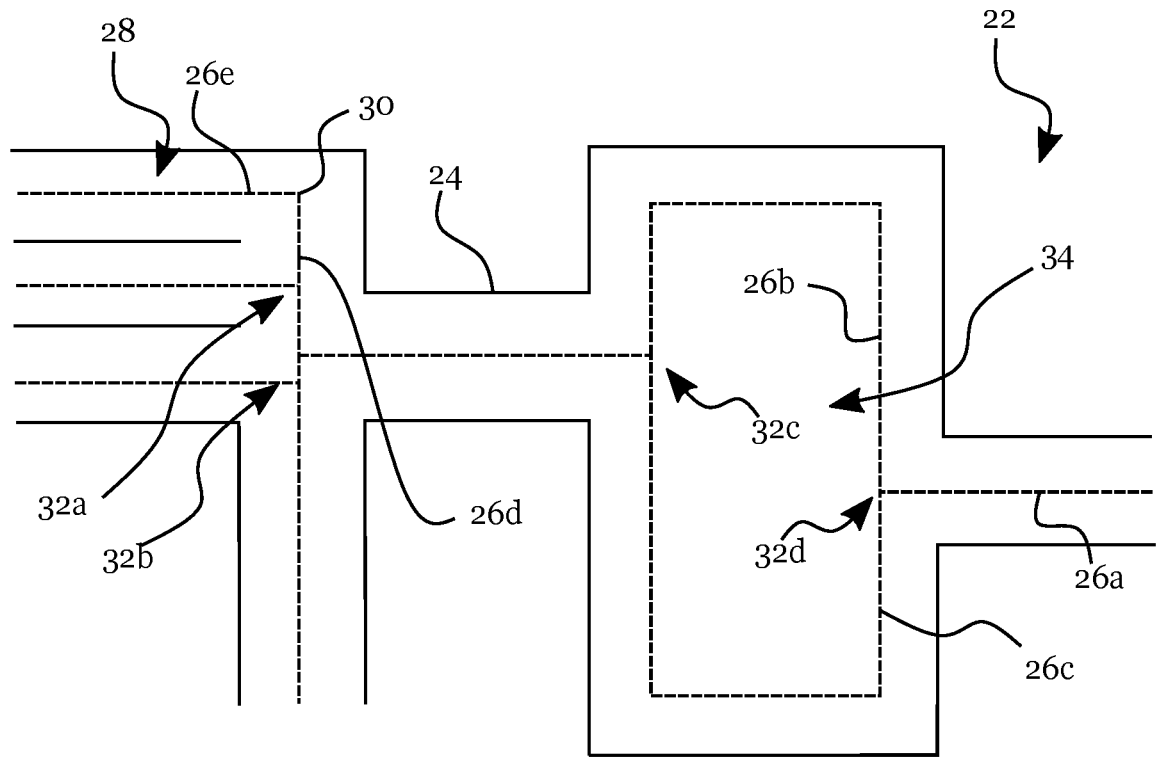
FIG. 4A shows a schematic representation of a map and a corresponding topological map according to an example.

FIG. 4A illustrates a superposition of a map 22 of a geographic area in a building with a corresponding topological map for said portion of the building according to an example. The map 22 provides an outline 24 of a walkable area in said building, wherein the outline 24 may be composed of wall sections. A plurality of topological paths 26a-e forms a graph of topological paths through said geographical area, such as the topological path 26e in one of the corridors 28. Vertices of said graph may be bends 30 of the topological map where two topological paths 26d, 26e meet, or may form intersections 32a-d, at or close to vertices of more than two topological paths 26a-e, such as intersection 32d of topological paths 26a-c defining different topological connections through an open space 34.

Figure 4B:
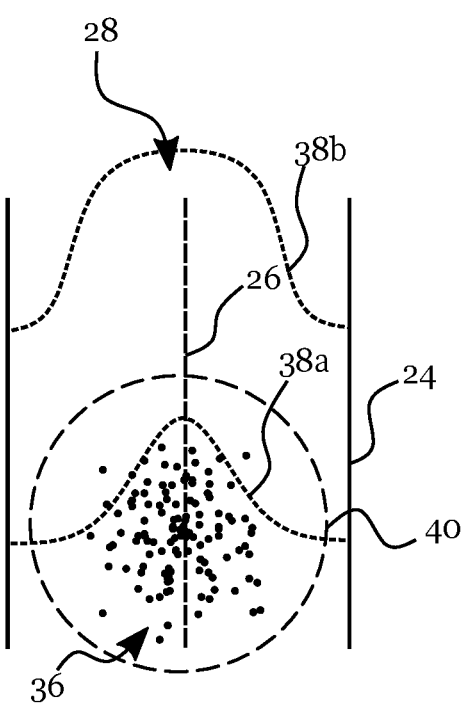
FIG. 4B illustrates a schematic representation of a particle cloud for representing a probability distribution of a mobile device location in a corridor according to an example.

FIG. 4B illustrates a schematic close up view of a corridor 28 of the map 22 according to an example. A particle cloud 36 comprising a plurality of particles as location candidates for the mobile device 10 is additionally depicted close to the topological path 26 in the corridor 28 delimited by the wall outline 24. The particle cloud 36 may represent a discretized probability distribution with respect to the estimated position of the mobile device 10 and a current (weighted) mean location of the plurality of particles in the particle cloud 36 may be used to estimate the current most likely location of the mobile device 10.

The particle cloud 36 can be associated with an uncertainty radius 40 representing an estimation of reliability for said representation of the mobile device 10 location by the particle cloud 36. The uncertainty radius 40 can be used to initialize the particle cloud 36 for representing a current estimated location of the mobile device 10 and the plurality of particles 36 may be distributed within a circle defined by said uncertainty radius 40 around an estimated initial location of the mobile device 10 at the beginning of a method for tracking the mobile device 10.

The skilled person will appreciate that said uncertainty radius 40 need not be a strict border for a particle area, but rather may be a representation of likelihood borders of a probability distribution, such as a multiple of a standard deviation of a probability distribution for initializing and/or regenerating said particles. For example, the uncertainty radius may define a distance to the current most likely mobile device location outside of which less than 20%, 5% or 1% of particles are initialized and/or regenerated. However, for the sake of simplicity, in the following the uncertainty radius 40 will be described as a discrete radius defining a border for particle initialization and/or regeneration. Implementing the uncertainty radius 40 as a discrete border for placing particles can additionally reduce the impact of probability spikes, such that this illustrated implementation is also a preferred embodiment of the method and system for tracking the mobile device 10.

Initialized particles of the particle cloud 36 can then be individually propagated and weighted according to their agreement with adjacent topological paths 26, 26a-e through the map 22.

The topological path 26 can be associated with a corresponding width indicating a sleeve around the topological path 26 for particle placement inside of the corridor 28. For example, the width of the topological path 26 may correspond or be derived from the width of the corridor 28 as defined by the wall outline 24. Said width may further be used to define a probability distribution 38a, 38b around said topological path 26 indicating probable locations for a mobile device 10 traversing said corridor 28. For example, the width may be used to determine a variance of a normal distribution 38a centered on the topological path 26 for weighting the plurality of particles 36. However, other probability distributions, such as the probability distribution 38b or an asymmetric probability distribution could also be used without intending any loss of generality. Preferably, particles are initialized and regenerated only within an intersection of a circle defined by the uncertainty radius 40 around the current mean location of the plurality of particles 36 with the sleeve of adjacent topological paths 26.

Figure 4C:
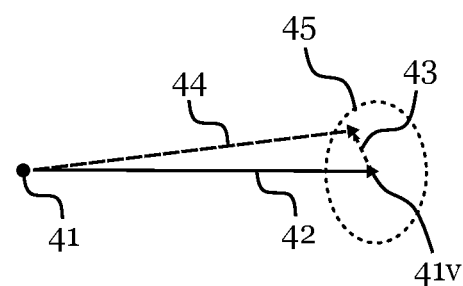
FIG. 4C schematically illustrates a scheme for displacing individual particles of the plurality of particles according to an example.

FIG. 4C schematically illustrates a scheme for displacing individual particles 41 of the plurality of particles 36 on the map 22 according to an example. Based on a measured displacement vector 42, a randomized particle displacement vector 44 can be generated taking into account an uncertainty of the measured displacement vector 42. For example, and as illustrated in FIG. 4C, the uncertainty of the measured displacement vector 42 may be used to derive a spatial dispersion 45 (schematically illustrated as a dispersion area delimited by a dashed outline) and the particle 41 may be displaced according to the measured displacement vector 42 to a virtual particle position 41v from which it is then randomly displaced according to the spatial dispersion 45 by a randomization vector 43 to an at least partially randomized particle position to determine the randomized particle displacement vector 44.

Figure 4D:
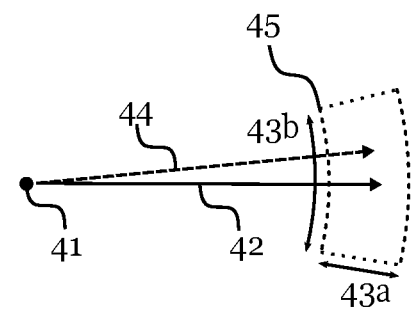
FIG. 4D schematically illustrates another scheme for displacing individual particles of the plurality of particles according to an example.

FIG. 4D schematically illustrates a determination of a particle displacement vector 44 based on the measured displacement vector 42 for a particle 41 according to another example. In the depicted example, the uncertainty of the measured displacement vector 42 comprises uncertainty of the displacement distance 43a (schematically depicted as a variance vector) and an uncertainty of the displacement direction 43b (schematically depicted as a variance arc section), and an associated combined spatial dispersion 45 is schematically depicted as a dotted area around the endpoint of the measured displacement vector 42. Thus, both a direction component as well as a length component of the measured displacing vector 42 may be randomized according to said uncertainty of the displacement direction 43b and displacement distance 43a, such as by at least partially randomizing each of said length and direction of the measured displacement vector 42 according to a respective normal distribution, to obtain the randomized particle displacement vector 44.

Following displacement of each of the particles 41, the particle cloud 36 is reweighted, attributing a weight to each of said displaced particles 41 in the particle cloud 36, wherein the weight should be based on a distance of the particle 41 to the adjacent topological path 26, such as according to a probability distribution 38a, 38b associated with said adjacent topological path 26, and based on a comparison of the particle displacement vector 44 with a path direction of the adjacent of logical path 26, such as a scalar product of the particle displacement vector 44 and the path direction, or a function thereof.

Particles 41 having lower weight, such as a particle weight below a weight threshold, and in particular particles 41 having the lowest weight, such as a given fraction of particles 41 associated with the lowest weights in the particle cloud 36, may then be deleted. New particles 41 around a (weighted) mean location of the plurality of particles 36 can then be newly generated according to a probability distribution influenced by the value of the uncertainty radius 40 and/or delimited by the uncertainty radius 40 and a sleeve around adjacent topological paths 26. A heading of said newly generated particles 41 may be initialized to a weighted mean heading of the plurality of particles 36.

Repeating the steps of determining the particle displacement vectors 44, and weighting each of the particles 41 for a subsequent resampling, such as according to the steps S14 to S22 illustrated in FIG. 3, can then be used to track the mobile device 10 in the geographical area associated with the map 22.

Weighting particles based on a comparison of the particle displacement vector 44 and the path direction of an adjacent topological path 26 and/or the distance to said topological path 26 and subsequent resampling of the plurality of particles 36 may allow correcting an initial displacement direction estimate 42 during motion along topological paths 26 and corresponding direction difference between the estimated direction 42 of the mobile device 10 and the path direction of an adjacent topological path 26, since particles 41 deviating from the adjacent topological paths 26 are culled during the resampling of the plurality of particles 36.

Figure 5:
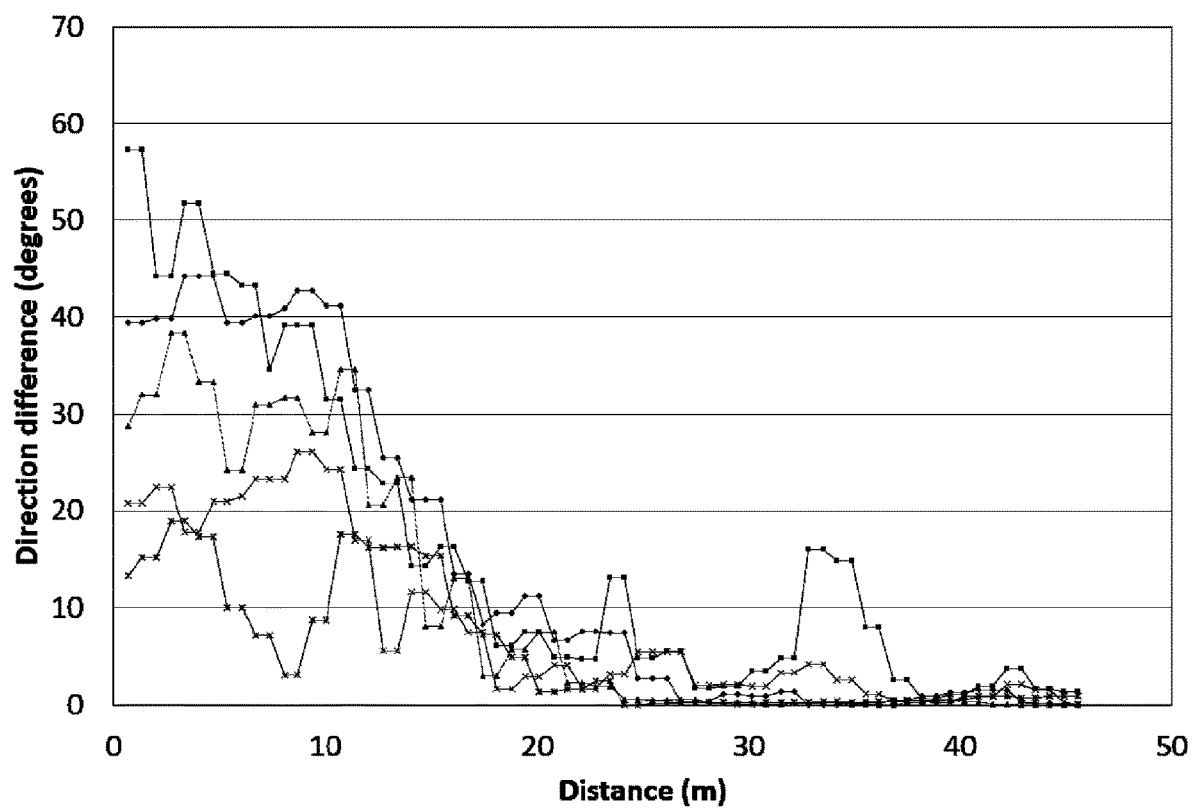
FIG. 5 illustrates the evolution of the direction difference as a function of traveled distance for a mobile device displaced along a straight corridor for different exemplary measurements performed with a navigation system according to an example.

FIG. 5 illustrates the evolution of the direction difference as a function of traveled distance for a mobile device 10 displaced along a straight corridor 28 according to an example, wherein different graphs indicate different experiments performed with a different initial direction estimate. The direction difference is an angular deviation between the path direction of the straight corridor 28 and the direction estimate 42 for the mobile device 10 which can be determined from the weighted mean particle displacement direction of the plurality of particles 36. As can be seen from the graph, the direction difference starting from different values slowly, but consistently converges to 0°, even for an initial error of 57° over the course of about 20 m.

FIGS. 6A-D illustrate different examples of navigation situations, wherein different sensor data is provided by a mobile device 10 for the same segment of a virtual map 22 and a particle cloud 36 representing a discretized probably distribution of the mobile device location is displaced accordingly, wherein an initial path 26a, which the particle cloud 36 initially follows, splits up at intersection 32a into two paths 26b, 26c traversing an open space 34.

Figure 6A:
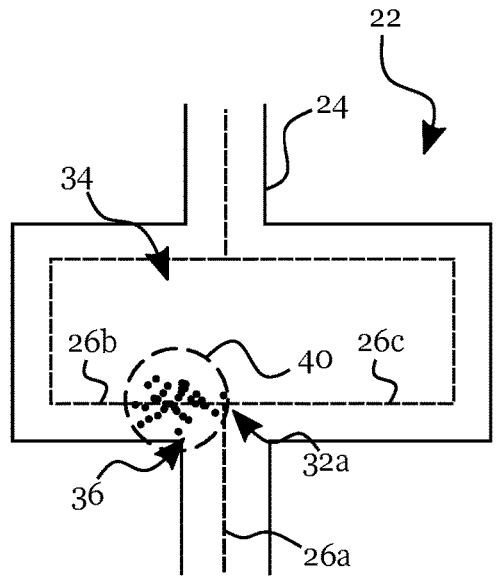
FIGS. 6A-C schematically illustrate different examples of navigation situations for the same segment of a map but for different motion measurements of the mobile device.

In FIG. 6A, the mobile device 10 detects a turn/movement to the left based on a measurement of the motion sensor 16 and the plurality of particles 36 previously placed close to the topological path 26a are displaced towards the left and follow the topological path 26b along the left side of the open space 34.

Figure 6B:
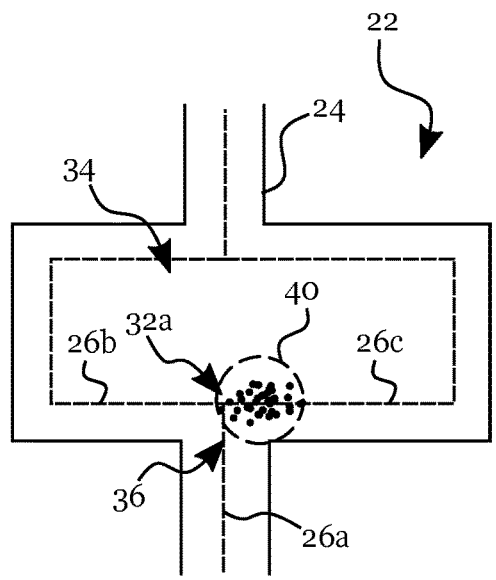

On the other hand, in FIG. 6B, the mobile device 10 detects a turn/movement to the right based on a measurement of the motion sensor 16 and the plurality of particles 36 previously placed close to the topological path 26a are displaced towards the left and follow the topological path 26c along the right side of the open space 34.

Figure 6C:
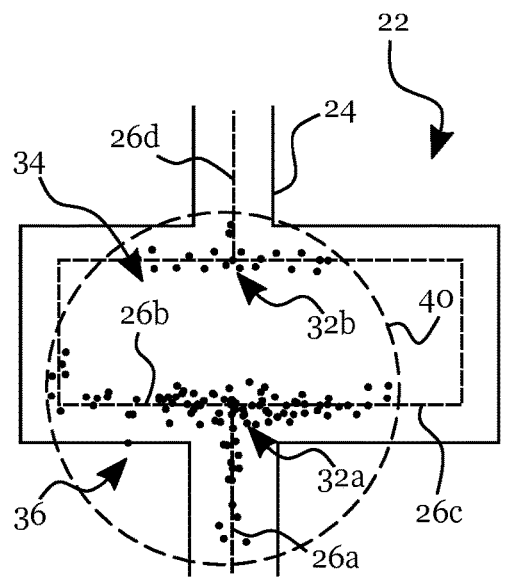

Since in FIGS. 6A, 6C the particle displacement direction 44 for the plurality of particles 36 is substantially parallel to the path direction, the uncertainty radius 40 remains relatively small and regenerated particles 41 are placed in a dense particle cloud 36 within a sleeve around the topological paths 26b, 26c, respectively.

On the other hand, in FIG. 6C, no turn is detected based on the readings of the motion sensors 16 of the mobile device 10 and a displacement direction 42 for the plurality of particles 36 may still be substantially aligned along the path direction of the topological path 26a, such that particles 41 are displaced from the intersection 32a into the open space 34 of the map 22 (not shown, particle displacement and resampling precedes the illustrated situation). As these displaced particles 41 are assigned low weight, the uncertainty radius 40 is increased, as illustrated in FIG. 6C. Particles 41 are then resampled within a sleeve around the paths 26a, 26b, 26c along the outline of the open space 34. Eventually however, the second intersection 32b will be inside of the uncertainty radius 40 (as shown) and particles 41 regenerated close to the second intersection 32b at the other end of the open space 34 will be assigned higher weight, such that, after one or more steps of resampling the plurality of particles 36, a mean location of the plurality of particles 36 will converge on the path 26d despite a direct connection from intersection 32a to 32b not being recorded in the map 22.

An increase of the uncertainty radius 40 may be proportional to the displacement distance and may be further proportional to the weight of the particles 41. For example, the uncertainty radius 40 may be increased, such that said uncertainty radius 40 substantially increases by the displacement distance when the displacement direction of all of the plurality of particles 36 is orthogonal to the path direction of the corresponding adjacent topological path 26.

Figure 6D:
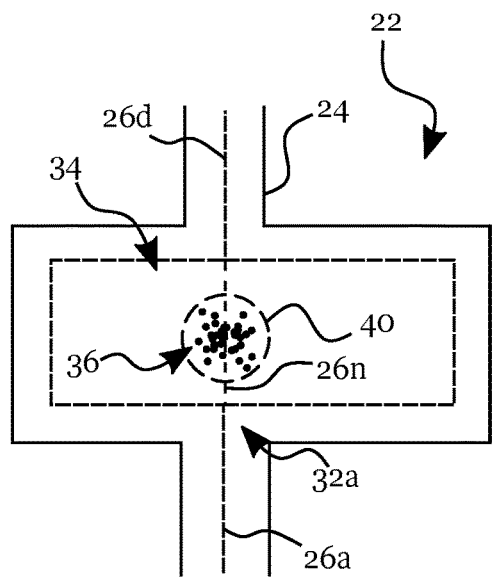
FIG. 6D schematically illustrates an example of a navigation situation, wherein a new topological path segment is generated based on a location measurement of the mobile device.

FIG. 6D illustrates a similar example, wherein the mobile device 10 also does not detect a turn at intersection 32a and the uncertainty radius 40 first increases (not illustrated). In the illustrated example, the mobile device 10 subsequently receives a location signal at a location inside of the open space 34 and an associated uncertainty which is smaller than the uncertainty radius 40. The mobile device 10 then reinitializes the uncertainty radius 40 and the center of the uncertainty radius 40 to the circle defined by the location signal and uncertainty associated with the location signal, as illustrated in the figure. The particles 36 can then be regenerated within the modified uncertainty radius 40. The mobile device 10 may then infer a missing intersection link between the intersections 32a, 32b and may insert a new topological path 26n at the current weighted mean location of the plurality of particles 36, for example if no topological path 26 is located within the modified uncertainty radius 40. The new topological path 26n may be stored within the mobile device 10 and/or later shared with a server to update a topological map of the geographic area.

Figure 7A:
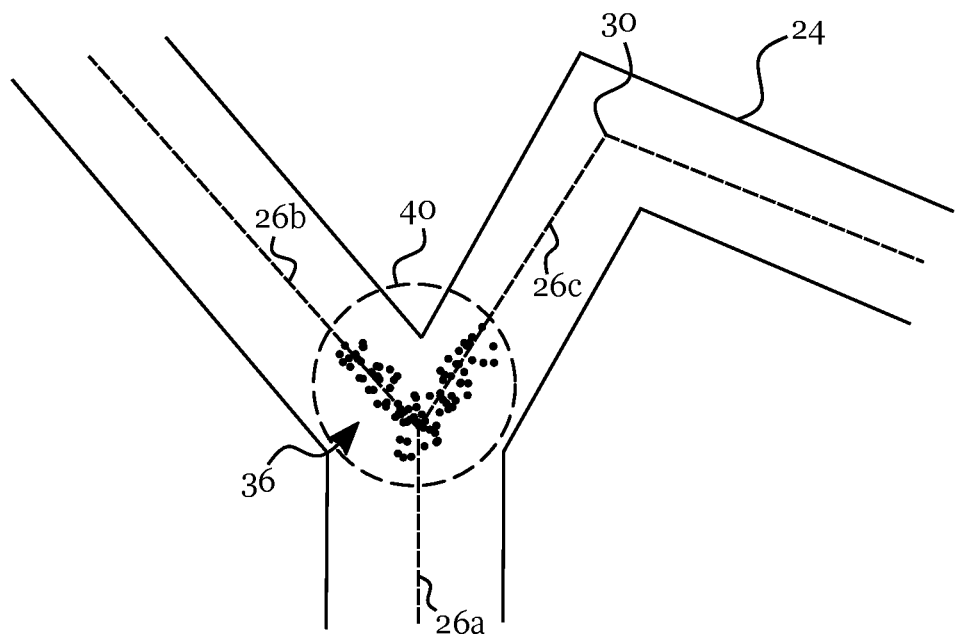
FIG. 7A schematically illustrates an example of a navigation situation, wherein a path ambiguity leads to resampling of particles in different corridors.

FIG. 7A illustrates an example of a navigation situation, wherein a topological path 26a splits into two topological paths 26b, 26c, wherein a difference of the path direction of the topological paths 26b, 26c with respect to the path direction of the topological path 26a is relatively small. The plurality of particles 36 may then be resampled within the sleeves of both topological paths 26b, 26c, and, depending on an uncertainty of the measured displacement direction 42, may also start propagating along both topological paths 26b, 26c. Preferably, the uncertainty radius 40 increases based on a spatial spread of the plurality of particles 36, such that the uncertainty radius 40 increases despite the plurality of particles 36 having a high weight with respect to their adjacent topological paths 26b, 26c.

However, the skilled person will appreciate that a further motion sensor measurement or lack thereof, such as detection or non-detection of turn 30, may result in particles 41 previously following the wrong path (e.g., the left topological path 26b or right topological path 26c, respectively) being preferably resampled, such that an ambiguity may be resolved based on further motion sensor measurements. In some embodiments, the method for tracking the mobile device 10 may divide the particles 41 into low particle number clusters at each intersection 32*a-d* and may delete clusters based on the cumulative weight of the plurality of particles 36 in the cluster to resolve an ambiguity of the mobile device location.

Figure 7B:
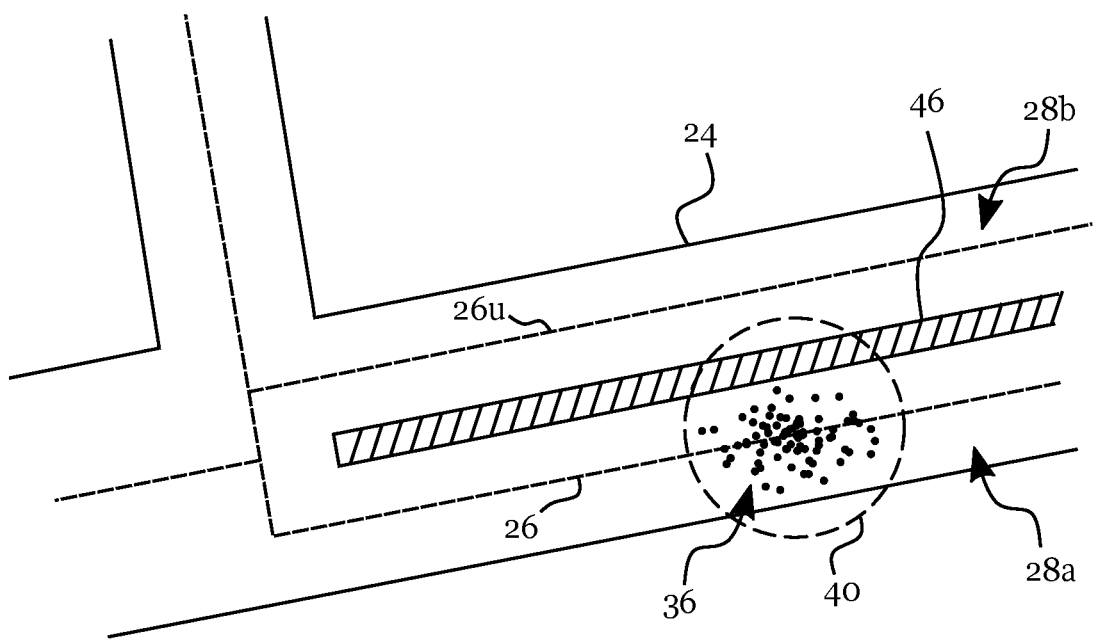
FIG. 7B schematically illustrates an example of a navigation situation, wherein resampling of particles in a neighboring corridor is prohibited due to a topological restriction.

FIG. 7B illustrates an example of a navigation situation, wherein two adjacent corridors 28*a*, 28*b* are separated by a thin wall 46 and the plurality of particles 36 propagates along an adjacent topological path 26 within one of the corridors 28*a*. However, since the uncertainty radius 40 is larger than a width of the corridor 28*a*, particles 41 could in principle be resampled in the adjacent corridor 28*b* across the wall 46. To avoid particle teleportation through walls, the processing unit 12 of the mobile device 10 preferably excludes topologically unconnected geographic areas from a particle regeneration area for regenerating particles 41.

A topologically unconnected geographic area may be a geographic area within a sleeve around an unconnected topological path 26*u*. The unconnected topological path 26*u* may be a path which does not have a probable topological connection to the mean location of the plurality of particles 36 or to a particle 41 selected for resampling. For example, a topological connection to the unconnected topological path 26*u* may lie at least partially outside of a circle defined by the uncertainty radius 40 around the current mean location of the plurality of particles 36 and/or may have a distance which is longer than a distance threshold, said distance threshold depending on the uncertainty radius 40.

The locating module 21 may further apply wall collision detection, such as to detect displacements of particles 41 according to the particle displacement vector 44 going through a wall 46. Particles 41 going through a wall 46 should be attributed lower weight, in particular zero weight, and/or may be placed at the edge of the wall 46.

In addition, in the particle regeneration area non-walkable areas may also be excluded, such as the areas covered by map objects, e.g., walls, desks, chairs, fountains, or the like.

Figure 8:
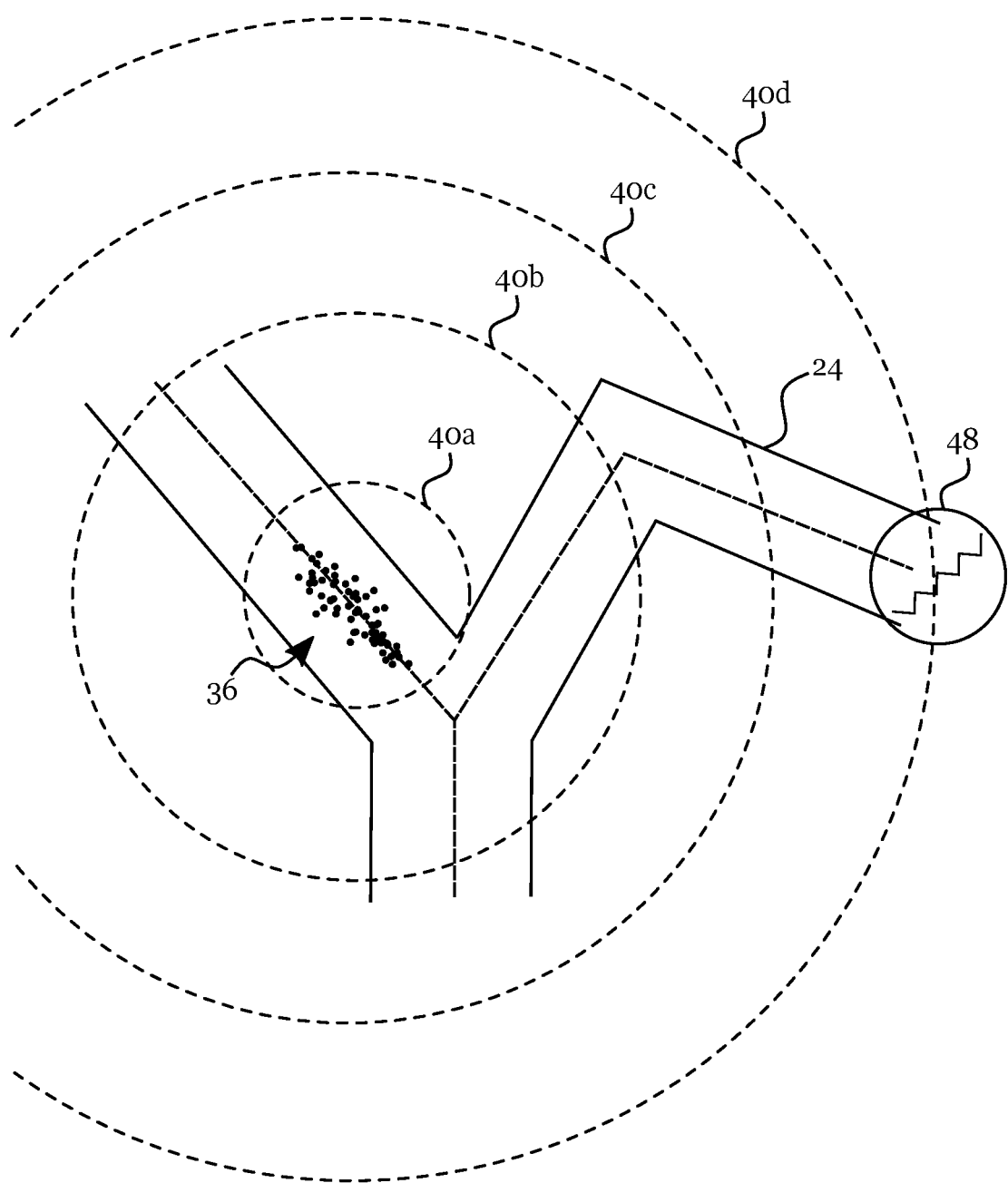
FIG. 8 illustrates another example of a navigation situation, wherein a geographic context is detected based on sensor measurements of the mobile device.

FIG. 8 illustrates another example of a navigation situation, wherein a geographic context relating to stairs-climbing is detected based on measurements of a motion sensor 16 of the mobile device 10. A locating module 21 for the mobile device 10 may thus check whether a location 48 matching said stairs-climbing context, e.g., a staircase, lies within an initial uncertainty radius 40*a*. Since in FIG. 8, no matching geographic context location 48 is initially detected within the initial uncertainty radius 40*a*, the uncertainty radius 40*a* is subsequently increased until either the context extraction module M2 indicates an end of geographic context detection or until a matching geographic context location 48 is located within the uncertainty radius 40*d*. Thus, wrongly detected geographic contexts may have a non-significant influence on the estimated position of the mobile device 10 when the mobile device 10 is sufficiently far from a matching context location. However, the geographic context can be used to correct an accumulated position error for the estimated position of the mobile device 10 if a correctly identified matching geographic context location 48 is sufficiently close.

The handling of a location signal, such as geographic context, may depend on the type of location signal/geographic context. For example, an external GPS signal and/or a location fingerprint of detected radiofrequency signals may induce reinitialization of all particles 41 when the uncertainty radius is above a certain threshold as illustrated in the example of FIG. 4D. Said threshold may depend on uncertainty associated with the location signal/geographic context.

Other location signals/geographic contexts may be handled similar to the stairs-climbing context. For example, the mobile device 10 may detect a variation of a luminescence on a sensor of the mobile device 10, such as an increased luminescence or specific wavelength profile due to the presence of a lamp and/or lamp constellation, or may detect a luminescence above a certain threshold, such as a threshold associated with natural light indicating proximity of a window. Similarly, the context extraction module M2 of a locating module 21 may detect a door opening context, such as based on an acceleration/deceleration pattern (e.g., a motion interruption at a fraction of a step length) and/or a sudden barometric pressure change. For example, the context extraction module may determine a geographic context relating to the presence of a door in the vicinity of the mobile device 10 based on a determined change of a step length. In these cases, particles 41 close to a matching geographic context location 48 (window location, door location) which lies inside of the uncertainty radius 40 may be attributed higher weight, while said geographic context may be disregarded if no matching geographic context location 48 lies within the uncertainty radius 40.

In some examples, the context extraction module M2 extracts a travelled height, such as a number of stairs or a number of floors, for the activity context and the geographic context is continuously updated with the travelled height, such as to center the location signal of the geographic context location 48 on a specific stair of the staircase or such as to define a floor for the geographic context location 48.

Accordingly, the detection of a geographic context may also be used to flatten a z-component of the estimated position of the mobile device 10. For example, the detection of a walking context following a detection of a stairs-climbing/elevator/escalator context may be used to flatten the particle positions into a 2D plane on a corresponding floor, such as a floor matching an expected barometer measurement. On the other hand, detection of a stairs-climbing context may induce a spread of the particle cloud 36 in three-dimensions. Thus, the context extraction module M2 may improve tracking of a mobile device 10 in multi-leveled maps, such as in buildings having several floors.

The skilled person will appreciate that said third dimension, i.e., a height component of the state vector for each particle 41, has been largely omitted in the preceding discussion for better illustration. However, the above described techniques methods and modules may notwithstanding be advantageously used to track a mobile device 10 in three dimensions, and the state vector may be enriched accordingly, such as by incorporating a z-component for the location of a particle 41 and/or by defining a three-dimensional particle displacement vector. Similarly, the skilled person will appreciate that the state vectors for each particle 41 and any displacement vectors are representation-independent and may generally be represented in any arbitrary fashion, such as by a Euclidian, a polar/spherical coordinate system, complex numbers, or the like, and the above-used representation should be construed as illustrative rather than limiting.

The description of the preferred embodiments and the figures merely serve to illustrate the invention and the beneficial effects associated therewith, but should not be understood to imply any limitation. The scope of the invention is to be determined solely by the appended claims.

LIST OF REFERENCE SIGNS 10 mobile device
12 processing unit
14 storage
16 motion sensors
18 location sensors
20 communication unit
21 locating module
22 virtual map
24 map outline
26, 26a-e topological path
26n newly generated topological path
26u unconnected topological path
28, 28a,b corridor
30 turn
32a-d intersection
34 open space
36 plurality of particles/particle cloud
38a,b probability distribution
40, 40a-d uncertainty radius
41 particle
41v virtual particle position
42 measured/estimated displacement vector
43 randomization vector
43a uncertainty of displacement distance
43b uncertainty of displacement direction
44 particle displacement vector
45 spatial dispersion
46 wall
48 geographic context location
M1 mapping module
M2 context extraction module
M3 pedometer
M4 initial direction module
M5 direction module
M6 particle filtering module
M7 visualization module The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method for tracking a mobile device in a geographic area based on a series of motion measurements of said mobile device, said method comprising the steps of:
   a) retrieving a topological map for said geographic area, said topological map providing a graph of topological paths through said geographic area, wherein each topological path is associated with a corresponding path direction;
   b) statistically generating, on a virtual map of said geographic area, a plurality of particles around an estimated initial position of the mobile device, a spatial dispersion of said particles representing an initial uncertainty of said estimated initial position of the mobile device;
   c) determining, from said series of motion measurements, a measured displacement vector of the mobile device, the measured displacement vector representing an estimated displacement direction and an estimated displacement distance of the mobile device;
   d) displacing each of said particles on the virtual map according to a randomized particle displacement vector which is derived from said measured displacement vector based on an uncertainty of the measured displacement vector and recording said particle displacement vector for each displaced particle;
   e) determining a weight of each particle based on one or more of a comparison of the respective particle displacement vector with the path direction of an adjacent topological path and a distance of the particle to the adjacent topological path;
   f) resampling the plurality of particles, said resampling comprising selecting a subset of said displaced particles based on a particle-weight dependent selection criterion, wherein said selection criterion is such that particles with lower weight are more likely to be resampled than particles with higher weight; and
   g) wherein the resampling further comprises regenerating said selected subset of displaced particles within a particle regeneration area around a current mean location of the plurality of particles according to a probability distribution.

2. The method of claim 1, further comprising the step of: determining, based on said series of motion measurements, the uncertainty of the measured displacement vector of the mobile device.

3. The method of claim 1, wherein the uncertainty of the measured displacement vector comprises an uncertainty of the measured displacement direction, and displacing each of said particles comprises statistically generating a particle displacement direction for each of said particles according to a probability distribution based on said uncertainty of the measured displacement direction.

4. The method of claim 1, wherein for each particle, the adjacent topological path is the path, which, during determining the weight for each particle, is associated with the highest weight for that particle.

5. The method of claim 1, wherein said probability distribution is characterized by an uncertainty radius around the current mean location of the plurality of particles.

6. The method of claim 5, wherein the adjacent topological path is a path at least partially lying within a circle around the current mean location of the plurality of particles, a radius of said circle depending on the uncertainty radius.

7. The method of claim 5, further comprising the step of: adjusting the uncertainty radius based on one or more of the comparison of the particle displacement vector with the path direction of the adjacent topological path at least one classification figure of the weights of a plurality of said particles.

8. The method of claim 5, wherein the particle regeneration area is derived from an intersection of a circle around the current mean location of the plurality of particles, a radius of said circle depending on the uncertainty radius, and a walkable area, said walkable area being derived from the geometrical features of the virtual map, or from an intersection of said circle and a sleeve around said graph of topological paths, said sleeve defining a walkable area around each topological path with a path width associated to each topological path.

9. The method of claim 5, further comprising the step of:
excluding, from said particle regeneration area for regenerating particles, geographic areas not having a topological connection to the current mean position of the plurality of particles or to a current most likely location of the mobile device.

10. The method of claim 1, wherein the method comprises periodically repeating steps c) to g) for tracking the mobile device, wherein a current estimated position of the mobile device is approximated as or derived from one or more of the current mean location of the plurality of particles, a weighted mean location of the plurality of particles, a highest weight particle of the plurality of particles, and a weighted mean location of a subset of the plurality of particles.

11. The method of claim 1, further comprising the steps of:
receiving a location signal for the mobile device and an associated uncertainty for the location signal; and
adjusting the weight of each particle based on the location signal and the associated uncertainty for the location signal.

12. The method of claim 1, further comprising the steps of:
determining a geographic context of the mobile device from the series of motion measurements;
deriving a location signal and an associated location uncertainty from said geographic context; and
adjusting the weight of each particle based on the location signal and the associated uncertainty for the location signal or adjusting an uncertainty radius around the current mean location of the plurality of particles based on the geographic context.

13. The method of claim 10, wherein the method further comprises the steps of:
comparing the associated uncertainty for the location signal with the uncertainty radius;
if the associated uncertainty for the location signal is smaller than the uncertainty radius by a given threshold, resampling a portion of said plurality of particles in a particle regeneration area around the location signal; and
adjusting the uncertainty radius based on the associated uncertainty for the location signal.

14. The method of claim 10, wherein the method further comprises the steps of:
comparing the associated uncertainty for the location signal with the uncertainty radius;
if the associated uncertainty for the location signal is smaller than the uncertainty radius, determining intersecting paths with respect to the location signal, said intersecting paths lying in or intersecting a particle regeneration area within a radius around the location signal, the radius given by the associated uncertainty for the location signal;
if no intersecting path is determined, generating a new path segment at the location signal.

15. A navigation system for tracking a mobile device in a geographic area, wherein said navigation system is configured to:

a) store or receive a topological map for said geographic area, said topological map providing a graph of topological paths through said geographic area, wherein each topological path is associated with a corresponding path direction;
b) statistically generate, on a virtual map of said geographic area, a plurality of particles around an estimated initial position of the mobile device, a spatial dispersion of said particles representing an initial uncertainty of said estimated initial position of the mobile device;
c) measure a series of displacements of said mobile device or receive a series of motion measurements of said mobile device and therefrom determine a measured displacement vector comprising an estimated displacement direction and an estimated displacement distance of the mobile device;
d) displace each of said particles on the virtual map according to a randomized particle displacement vector which is derived from said measured displacement vector based on an uncertainty of the measured displacement vector and recording said particle displacement vector for each displaced particle;
e) determine a weight of each particle based on one or more of a comparison of the respective particle displacement vector and of the path direction of an adjacent topological path and a distance of the particle to the adjacent topological path;
f) resample the plurality of particles, wherein the system is configured to select a subset of said displaced particles based on a particle-weight dependent selection criterion, wherein said selection criterion is such that particles with lower weight are more likely to be resampled than particles with higher weight; and
g) wherein the system is further configured to regenerate said selected subset of displaced particles within a particle regeneration area around a current mean location of the plurality of particles according to a probability distribution.

16. The system of claim 15, wherein the system is configured to determine, for each particle, a weight for each adjacent topological path to form particle weight candidates for said particle and wherein the system is further configured to attribute the highest weight from the particle weight candidates to that particle.

17. The system of claim 15, wherein said probability distribution is characterized by an uncertainty radius around the current mean location of the plurality of particles, and the system is further configured to:
adjust the uncertainty radius based on one or more of the comparison of the particle displacement vector with the path direction of the adjacent topological path and at least one classification figure of the weights of a plurality of said particles.

18. The system of claim 15, further configured to:
receive a location signal for the mobile device and an associated uncertainty for the location signal;
adjust the weight of each particle based on the location signal and the associated uncertainty for the location signal.

19. The system of claim 15, wherein the system is a mobile device and comprises motion measurement sensors for measuring one or more of a motion and/or a location of the mobile device, integrated with the mobile device.

20. A non-transitory computer-readable medium storing computer readable instructions that, when executed by a processing unit cause the processing unit to implement a method with the steps of:
- a) retrieving a topological map for said geographic area, said topological map providing a graph of topological paths through said geographic area, wherein each topological path is associated with a corresponding path direction;
- b) statistically generating, on a virtual map of said geographic area, a plurality of particles around an estimated initial position of the mobile device, a spatial dispersion of said particles representing an initial uncertainty of said estimated initial position of the mobile device;
- c) determining, from said series of motion measurements, a measured displacement vector of the mobile device, the measured displacement vector representing an estimated displacement direction and an estimated displacement distance of the mobile device;
- d) displacing each of said particles on the virtual map according to a randomized particle displacement vector which is derived from said measured displacement vector based on an uncertainty of the measured displacement vector and recording said particle displacement vector for each displaced particle;
- e) determining a weight of each particle based on one or more of a comparison of the respective particle displacement vector with the path direction of an adjacent topological path and a distance of the particle to the adjacent topological path;
- f) resampling the plurality of particles, said resampling comprising selecting a subset of said displaced particles based on a particle-weight dependent selection criterion, wherein said selection criterion is such that particles with lower weight are more likely to be resampled than particles with higher weight; and
- g) wherein the resampling further comprises regenerating said selected subset of displaced particles within a particle regeneration area around a current mean location of the plurality of particles according to a probability distribution.

* * * * *